United States Patent [19]
Kato et al.

[11] Patent Number: 5,207,617
[45] Date of Patent: May 4, 1993

[54] HYDRAULIC CONTROL APPARATUS FOR CONTINUOUSLY VARIABLE POWER TRANSMITTING SYSTEM INCLUDING REVERSING GEAR DEVICE AND AUXILIARY TRANSMISSION

[75] Inventors: Nobuyuki Kato; Yuji Hattori; Masami Sugaya, all of Susono, Japan

[73] Assignee: Toyota Jidosha Kabushiki Kaisha, Toyota, Japan

[21] Appl. No.: 883,252

[22] Filed: May 14, 1992

[30] Foreign Application Priority Data

Jun. 27, 1991 [JP] Japan .................................. 3-182979
Jun. 27, 1991 [JP] Japan .................................. 3-182981
Jun. 27, 1991 [JP] Japan .................................. 3-182982

[51] Int. Cl.$^5$ ............................................. F16H 61/00
[52] U.S. Cl. ........................................ 474/28; 74/867
[58] Field of Search ....................... 474/11, 12, 17, 18, 474/28, 69, 70; 74/865–867

[56] References Cited

U.S. PATENT DOCUMENTS

| | | | |
|---|---|---|---|
| 4,784,018 | 11/1988 | Okada et al. | |
| 4,867,732 | 9/1989 | Soga et al. | 474/28 |
| 4,923,433 | 5/1990 | Tanaka et al. | 474/28 X |
| 5,006,093 | 4/1991 | Itol et al. | 74/867 X |
| 5,094,129 | 3/1992 | Sugaya et al. | 74/867 X |

FOREIGN PATENT DOCUMENTS 61-2958 1/1986 Japan .
61-50845 4/1986 Japan .
63-83442 4/1988 Japan .
63-138245 9/1988 Japan .
235255 2/1990 Japan .

Primary Examiner—Thuy M. Bui
Attorney, Agent, or Firm—Oblon, Spivak, McClelland, Maier & Neustadt

[57] ABSTRACT

A hydraulic control apparatus for a power transmitting system including a continuously variable transmission, a reversing device, and an auxiliary transmission, which apparatus includes: a solenoid valve for generating a pilot pressure for selectively placing the auxiliary transmission in high- and low-gear positions; high-gear and low-gear control valves normally operable based on the pilot pressure, to control high- and low-gear coupling devices of the auxiliary transmission to establish the high- and low-gear positions. The low-gear control valve is operated to engage the low-gear coupling device, when the low-gear control valve receives a pressure to be applied to the reversing device for forward run of the vehicle. The high-gear control valve may be operated to release the high-gear coupling device, when a thrust based on a pressure applied to the low-gear coupling device exceeds a predetermined value. The hydraulic control apparatus may further include a device for increasing a torque capacity of the high-gear coupling device during an engaging action thereof when a shift lever is operated to a reverse-drive position for reverse run of the vehicle.

13 Claims, 12 Drawing Sheets

| SHIFT LEVER POSITION | | FORWARD CLUTCH C1 | REVERSE BRAKE B1 | SIXTH SOLENOID VALVE 162 | HIGH-GEAR CLUTCH C2 | LOW-GEAR BRAKE B2 |
|---|---|---|---|---|---|---|
| REVERSE | | x | o | on | o | x |
| NEUTRAL | | x | x | on | o | x |
| DRIVE | ANTI-SQUAT CONTROL | o | x | on | o | x |
| | LOW-GEAR POSITION | o | x | off | x | o |
| | HIGH-GEAR POSITION | o | x | on | o | o |

FIG. 3

HYDRAULIC CONTROL APPARATUS FOR CONTINUOUSLY VARIABLE POWER TRANSMITTING SYSTEM INCLUDING REVERSING GEAR DEVICE AND AUXILIARY TRANSMISSION

BACKGROUND OF THE INVENTION

1. Field of the Invention

The present invention relates to a hydraulic control apparatus for controlling a hydraulically operated power transmitting system used for a motor vehicle, which includes a continuously variable transmission, a reversing gear device and an auxiliary transmission.

2. Discussion of the Related Art

An example of a vehicle power transmitting system including a continuously variable transmission whose speed ratio is continuously variable is disclosed in laid-open Publication No. 61-2958 of unexamined Japanese Patent Application. The power transmitting system disclosed in this publication also includes an auxiliary transmission having a plurality of forward gear positions for increasing the range of speed ratio of the transmitting system. To reduce the whole size of the power transmitting system, it is considered to install the auxiliary transmission apart from a reversing gear device for selecting forward or reverse running of the vehicle, as disclosed in Japanese Patent Application No. 3-74468 filed on Mar. 14, 1991 in the name of the assignee of the present application. More specifically, the power transmitting system of this type includes: the continuously variable transmission; the reversing gear device which is rotated in opposite directions to permit forward and reverse running of the vehicle, and which includes forward and reverse frictionally coupling devices that are hydraulically operated depending upon a currently selected position of a shift lever of the vehicle; and the auxiliary transmission operable between a low-gear position which is established by engagement of a low-gear frictionally coupling device and a one-way clutch, and a high-gear position which is established by engagement of a high-gear frictionally coupling device.

A hydraulic control apparatus for controlling the above type of the power transmitting system is required to smoothly shift the auxiliary transmission from the low-gear position to the high-gear position, by engaging the high-gear frictionally coupling device while the low-gear frictionally coupling device is kept engaged, by utilizing engagement and disengagement of the one-way clutch. During a given period of time after the shift lever is operated from a neutral position to one of forward-drive positions, or while the shift lever is being operated to the neutral position, the hydraulic control apparatus is required to release the low-gear frictionally coupling device and engage the high-gear frictionally coupling device so as to perform an anti-squat control for lowing a driving torque transmitted through the transmission. Further, upon completion of this anti-squat control, the control apparatus is required to engage the low-gear frictionally coupling device and release the high-gear frictionally coupling device to establish the low-gear position of the auxiliary transmission. Since the low-gear and high-gear frictionally coupling devices need to be controlled independently of each other under the above situation, it is difficult to control the auxiliary transmission by using a common pilot pressure generated by a single solenoid-operated valve, as in a hydraulic control apparatus disclosed in the above-identified publication No. 61-2958. Thus, the known hydraulic control apparatus undesirably requires two solenoid-operated valves for controlling the respective low-gear and high-gear frictionally coupling devices.

The hydraulic control apparatus for the power transmitting system of the above type has another problem. Namely, when the shift lever is operated from a forward-drive position to a reverse-drive position while the auxiliary transmission is placed in the low-gear position, for example, the reverse frictionally coupling device operates to rotate the reversing gear device in the reverse direction to permit reverse running of the vehicle, and the high-gear frictionally coupling device operates to shift the auxiliary transmission from the low-gear position to the high-gear position.

When the shift lever is operated from the forward-drive position to the reverse-drive position while the auxiliary transmission is placed in the low-gear position, the reverse frictionally coupling device is engaged after the reversing gear device is held in a neutral position for some time upon releasing of the forward frictionally coupling device. At the same time, the high-gear frictionally coupling device is engaged after the auxiliary transmission is held in a neutral position for some time upon releasing of the low-gear frictionally coupling device. Thus, the reverse frictionally coupling device and high-gear frictionally coupling device are engaged in substantially the same period of time while the power transmitting line of the system is disconnected at the reverse gear device and auxiliary transmission. The engagement of each of the reverse and high-gear frictionally coupling devices is accomplished after a given period of engaging time in which the pressure for engaging the device is slowly increased by an accumulator, for example. Generally, the high-gear frictionally coupling device is provided with a relatively small torque capacity due to the function of the corresponding accumulator, so as to alleviate a shift shock induced upon shifting of the auxiliary transmission from the low-gear position to the high-gear position during running of the vehicle. Accordingly, if the reverse and high-gear frictionally coupling devices are substantially concurrently engaged, the engagement of the reverse frictionally coupling device is first completed, which is followed by completion of the engagement of the high-gear frictionally coupling device, due to the function of the respective accumulators. In this case, however, there may arise a double shift shock due to the engagements of the reverse and high-gear frictionally coupling devices, owing to the relatively small torque capacity of the high-gear frictionally coupling device during its engaging action, which makes it impossible to sufficiently absorb a shock induced upon establishment of the reverse gear position of the reversing gear device. The small torque capacity also causes slipping of the high-gear frictionally coupling device, resulting in reduced durability of this device.

In the above-described hydraulic control apparatus for the power transmitting system including the reversing gear device and the auxiliary transmission, the auxiliary transmission is placed in the low-gear position by engagement of the low-gear frictionally coupling device and one-way clutch which are disposed in series, and in the high-gear position by engagement of the high-gear frictionally coupling device. Where the low-gear and high-gear frictionally coupling devices are both placed in their released positions, the auxiliary transmission is placed in its neutral position for disconnecting the power transmitting line between the engine and drive wheels of the vehicle. For controlling the auxiliary transmission so that only the high-gear frictionally coupling device is engaged, or so that one of the high-gear and low-gear frictionally coupling devices is released while the other is engaged, the hydraulic control apparatus needs two control valves for the high-gear and low-gear frictionally coupling devices, respectively, and is required to perform a subtle timing control over these two control valves for engagements of the two frictionally coupling devices. This timing control is difficult to perform owing to a difference in the engaging characteristics between the individual frictionally coupling devices, a chronological change of the engaging characteristics, and variation of the engaging characteristics with the temperature of the working fluid. Namely, when the auxiliary transmission is shifted by engaging one of the low-gear and high-gear frictionally coupling devices and releasing the other, the vehicle will suffer from racing of the engine if the engagement of the one device after the releasing of the other takes place too late, and from a shift shock due to locking of the auxiliary transmission if the engagement of the one device after the releasing of the other takes place too early.

SUMMARY OF THE INVENTION

It is therefore a first object of the present invention to provide a simple hydraulic control apparatus for a power transmitting system including a continuously variable transmission and an auxiliary transmission, which is capable of controlling a low-gear frictionally coupling device and a high-gear frictionally coupling device of the auxiliary transmission independently of each other, by means of a single solenoid-operated valve for generating a common pilot pressure.

It is a second object of the invention to provide a hydraulic control apparatus for a power transmitting system including a continuously variable transmission, and an auxiliary transmission having low-gear and high-gear frictionally coupling devices, which power transmitting system is free from a shift shock when a shift lever is operated from a forward-drive position to a reverse-drive position while the auxiliary transmission is placed in a low-gear position.

It is a third object of the invention to provide a hydraulic control apparatus for a power transmitting system including a continuously variable transmission, and an auxiliary transmission having low-gear and high-gear frictionally coupling devices, which apparatus is capable of smoothly and easily shifting the auxiliary transmission even when the low-gear and high-gear frictionally coupling devices are controlled by respective control valves.

The first object may be attained according to a first aspect of the present invention, which provides a hydraulic control apparatus for a power transmitting system of a motor vehicle which includes: a continuously variable transmission whose speed ratio is continuously variable; a reversing gear device which is rotated in opposite directions to permit forward and reverse runs of the vehicle, the reversing gear device having a forward frictionally coupling device and a reverse frictionally coupling device which are hydraulically operated to select the corresponding forward or reverse run of the vehicle, depending upon a currently selected position of a shift lever of the vehicle; and an auxiliary transmission having a low-gear frictionally coupling device and a one-way clutch which are disposed in series, and a high-gear frictionally coupling device, the auxiliary transmission being placed in a selected one of a low-gear position by engagement of the low-gear frictionally coupling device and the one-way clutch, and a high-gear position by engagement of the high-gear frictionally coupling device, which hydraulically control apparatus comprises: (a) a solenoid-operated valve for generating a pilot pressure in response to a command signal for placing the auxiliary transmission in one of the low-gear position and the high-gear position; (b) a high-gear control valve for controlling the high-gear frictionally coupling device, the high-gear control valve including a first valve spool which is operable based on the pilot pressure between an engaging position and a releasing position for engaging and releasing the high-gear frictionally coupling device, respectively; and (c) a low-gear control valve for controlling the low-gear frictionally coupling device, the low-gear control valve including a second valve spool which is operable based on the pilot pressure between an engaging position and a releasing position for engaging and releasing the low-gear frictionally coupling device, respectively, the second valve spool being placed in the engaging position irrespective of the pilot pressure when the low-gear control valve receives a pressure applied to the forward frictionally coupling device for engagement thereof, which pressure is higher than a predetermined level.

In the hydraulic control apparatus constructed as described above, the valve spool of the low-gear control valve is preferentially placed in the engaging position for engaging the low-gear frictionally coupling device while the vehicle is running with the shift lever placed in one of forward-drive positions, since the pressure for engaging the forward frictionally coupling device acts on the valve spool in the direction toward the engaging position. Accordingly, the pilot pressure generated by the solenoid-operated valve is used only to operate the high-gear control valve. Immediately after the shift lever is shifted from the neutral position to the forward-drive position, however, the valve spool of the low-gear control valve is operable between the engaging and releasing positions based on the pilot pressure until the pressure for engaging the forward frictionally coupling device is raised to the predetermined level. In this condition, the low-gear and high-gear control valves are concurrently switched by the pilot pressure from the solenoid-operated valve, so as to engage the low-gear frictionally coupling device which has been released, and release the high-gear frictionally coupling device which has been engaged.

It follows from the above description that the single solenoid-operated valve is adapted to control only one of the low-gear and high-gear frictionally coupling devices or both of these frictionally coupling devices, depending upon whether the valve spool of the low-gear control valve is preferentially placed in the engaging position due to the pressure for engaging the forward frictionally coupling device. This arrangement does not require two solenoid-operated valves for controlling the respective low-gear and high-gear frictionally coupling devices, making the present hydraulic control apparatus simple in construction.

The above second object may be attained according to a second aspect of the present invention, which provides a hydraulic control apparatus for a power transmitting system of a motor vehicle which includes: a continuously variable transmission whose speed ratio is continuously variable; a reversing gear device which is rotated in opposite directions to permit forward and reverse runs of the vehicle, the reversing gear device having a forward frictionally coupling device and a reverse frictionally coupling device which are hydraulically operated to select the corresponding forward or reverse run of the vehicle, depending upon a currently selected position of a shift lever of the vehicle; and an auxiliary transmission disposed in series with the reversing gear device, and having a low-gear frictionally coupling device and a high-gear frictionally coupling device which are hydraulically operated to place the auxiliary transmission in a low-gear position and a high-gear position, respectively, the reverse frictionally coupling device and the high-gear frictionally coupling device being engaged when the shift lever is operated to a reverse-drive position for the reverse run of the vehicle, so that the reversing gear device is rotated in one of the opposite directions which permits the reverse run of the vehicle and so that the auxiliary transmission is placed in the high-gear position, which hydraulic control apparatus comprises means for increasing a torque capacity of the high-gear frictionally coupling device during an engaging action thereof when the shift lever is operated from a forward-drive position for the forward run of the vehicle to the reverse-drive position.

When the shift lever is operated from the forward-drive position to the reverse-drive position while the auxiliary transmission is placed in the low-gear position, the reverse frictionally coupling device and high-gear frictionally coupling device are engaged in substantially the same period of time while the power transmitting line is disconnected at the reversing gear device and auxiliary transmission. In the hydraulic control apparatus constructed as described above, since the torque capacity of the high-gear frictionally coupling device is increased during its engaging action upon operating of the shift lever from the forward-drive to reverse-drive position, the engagement of the high-gear frictionally coupling device is first completed, which is followed by completion of the engagement of the reverse frictionally coupling device.

In the above arrangement, the reverse frictionally coupling device is able to sufficiently absorb a shock occurring upon establishment of the reverse gear position of the reversing gear device, thereby eliminating the double shift shock as described above due to the engagements of the two frictionally coupling devices. Further, the engagement of the high-gear frictionally coupling device completed prior to that of the reverse frictionally coupling device leads to reduced slipping and improved durability of this device.

The above-indicated means for increasing a torque capacity may include: (a) a low-gear control valve for controlling the low-gear frictionally coupling device, the low-gear control valve being operable between an engaging position and a releasing position for engaging and releasing the low-gear frictionally coupling device, respectively; (b) an accumulator for slowly increasing an engaging pressure to be applied to the high-gear frictionally coupling device for engagement thereof; and (c) back-pressure increasing means incorporated in the low-gear control valve for increasing a back pressure of the accumulator to thereby increase the torque capacity of the high-gear frictionally coupling device when the low-gear control valve is operated from the engaging position to the releasing position.

According to the above feature of the present invention, the back pressure of the accumulator is increased when the low-gear control valve is operated to the position for releasing the low-gear frictionally coupling device, so that the pressure for engaging the high-gear frictionally coupling device is accordingly increased to increase the torque capacity of this device during its engaging action.

Consequently, the engagement of the high-gear frictionally coupling device is first completed, preceding completion of the engagement of the reverse frictionally coupling device. It is therefore possible for the reverse frictionally coupling device to sufficiently absorb a shock occurring upon establishment of the reverse gear position of the reversing gear device, thereby eliminating the double shift shock as described above due to the engagements of the two frictionally coupling devices. Further, the prior engagement of the high-gear frictionally coupling device leads to reduced slipping and improved durability of this device. Moreover, the back-pressure increasing means, which is incorporated in the low-gear control valve, can be operated without a shift timing valve or other switch means, resulting in a relatively simple construction of the present hydraulic control apparatus.

The third object may be attained according to a third aspect of the present invention, which provides a hydraulic control apparatus for a power transmitting system of a motor vehicle which includes a continuously variable transmission, a reversing gear device, and an auxiliary transmission disposed apart from the reversing gear device, the auxiliary transmission having a low-gear frictionally coupling device and a one-way clutch which are disposed in series, and a high-gear frictionally coupling device, the auxiliary transmission being placed in one of a low-gear position by engagement of the low-gear frictionally coupling device and the one-way clutch, and a high-gear position by engagement of the high-gear frictionally coupling device, a power transmitting line of the power transmitting system being disconnected when both of the low-gear and high-gear frictionally coupling devices are disengaged, which hydraulic control apparatus comprises: (a) a solenoid-operated valve for generating a pilot pressure in response to a command signal for placing the auxiliary transmission in one of the low-gear position and the high-gear position; (b) a low-gear control valve for controlling the low-gear frictionally coupling device, the low-gear control valve including a first valve spool which is operable based on the pilot pressure between an engaging position and a releasing position for engaging and releasing the low-gear frictionally coupling device, respectively; and (c) a high-gear control valve for controlling the high-gear frictionally coupling device, the high-gear control valve including a second valve spool which is operable based on the pilot pressure between an engaging position and a releasing position for engaging and releasing the high-gear frictionally coupling device, respectively, the second valve spool being placed in the releasing position when a thrust based on an engaging pressure applied to the low-gear frictionally coupling device exceeds a predetermined value.

In the hydraulic control apparatus constructed as described above, the low-gear and high-gear control valves which are controlled by a common pilot pressure are provided for controlling the low-gear and high-gear frictionally coupling devices, respectively. When the low-gear frictionally coupling device is engaged while at the same time the high-gear frictionally coupling device is released, the valve spool of the high-gear control valve is moved to the position for releasing the high-gear frictionally coupling device when a thrust based on the pressure for engaging the low-gear frictionally coupling device exceeds a predetermined value. Accordingly, the releasing of the high-gear frictionally coupling device is suitably effected when the low-gear frictionally coupling device reaches a predetermined state of engagement thereof.

According to the present invention, therefore, the auxiliary transmission may be smoothly and readily shifted from the high-gear position to the low-gear position, without suffering from the racing of the engine due to early releasing of the high-gear frictionally coupling device, or the shift shock which occurs upon locking of the auxiliary transmission due to late releasing of the same device.

BRIEF DESCRIPTION OF THE DRAWINGS

The above and optional objects, features and advantages of the present invention will become more apparent by reading the following description of a presently preferred embodiment of the present invention, when considered in conjunction with the accompanying drawings, in which:

FIG. 3 is a table indicating a relationship between operating positions of a shift lever and a selected gear position of the auxiliary transmission;

DETAILED DESCRIPTION OF THE PREFERRED EMBODIMENT

Figure 1:
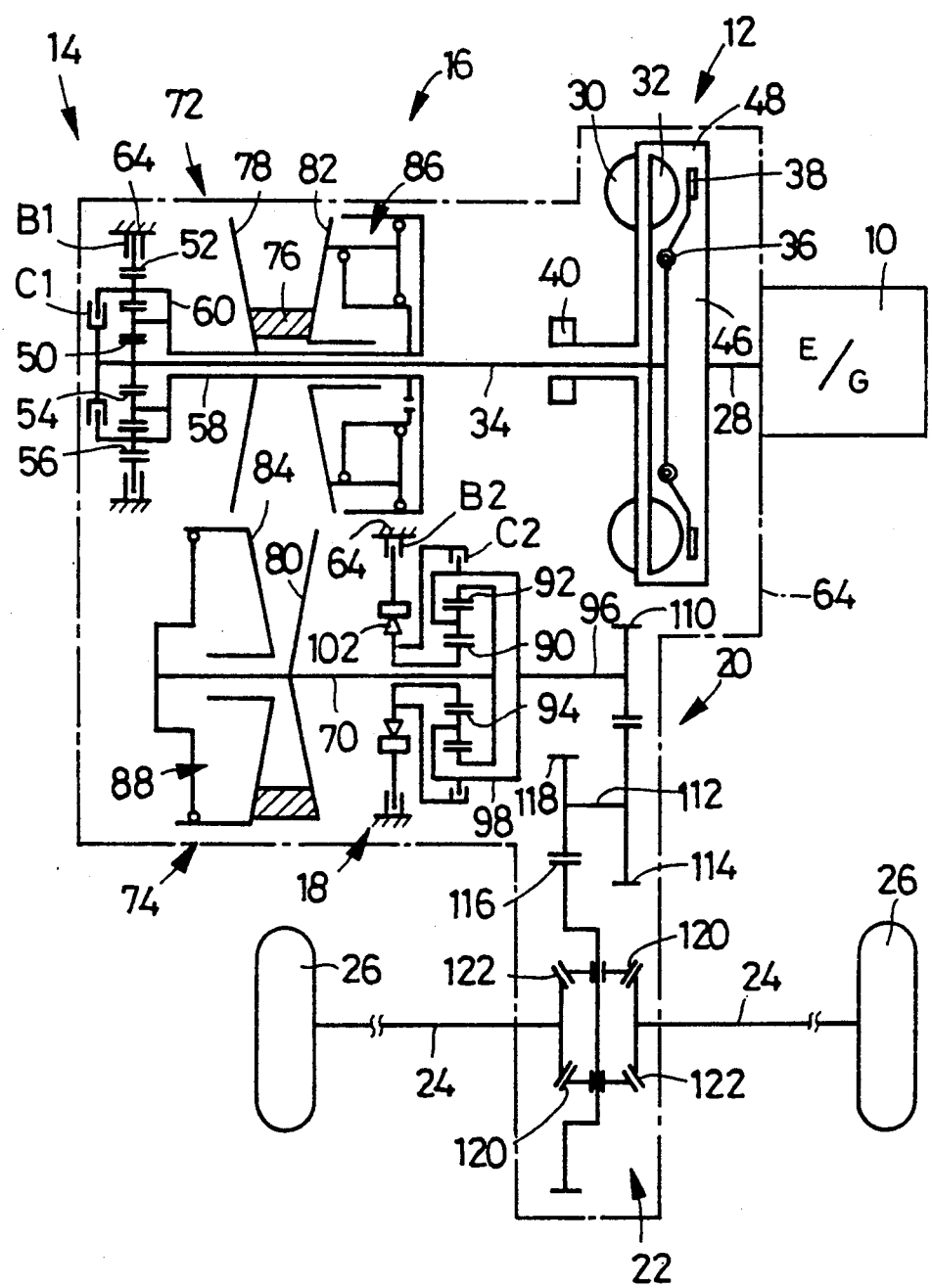
FIG. 1 is a schematic view of a power transmitting system including a continuously variable transmission, a reversing gear device and an auxiliary transmission, which is equipped with a hydraulic control apparatus constructed according to one embodiment of the present invention.
Figure 2:
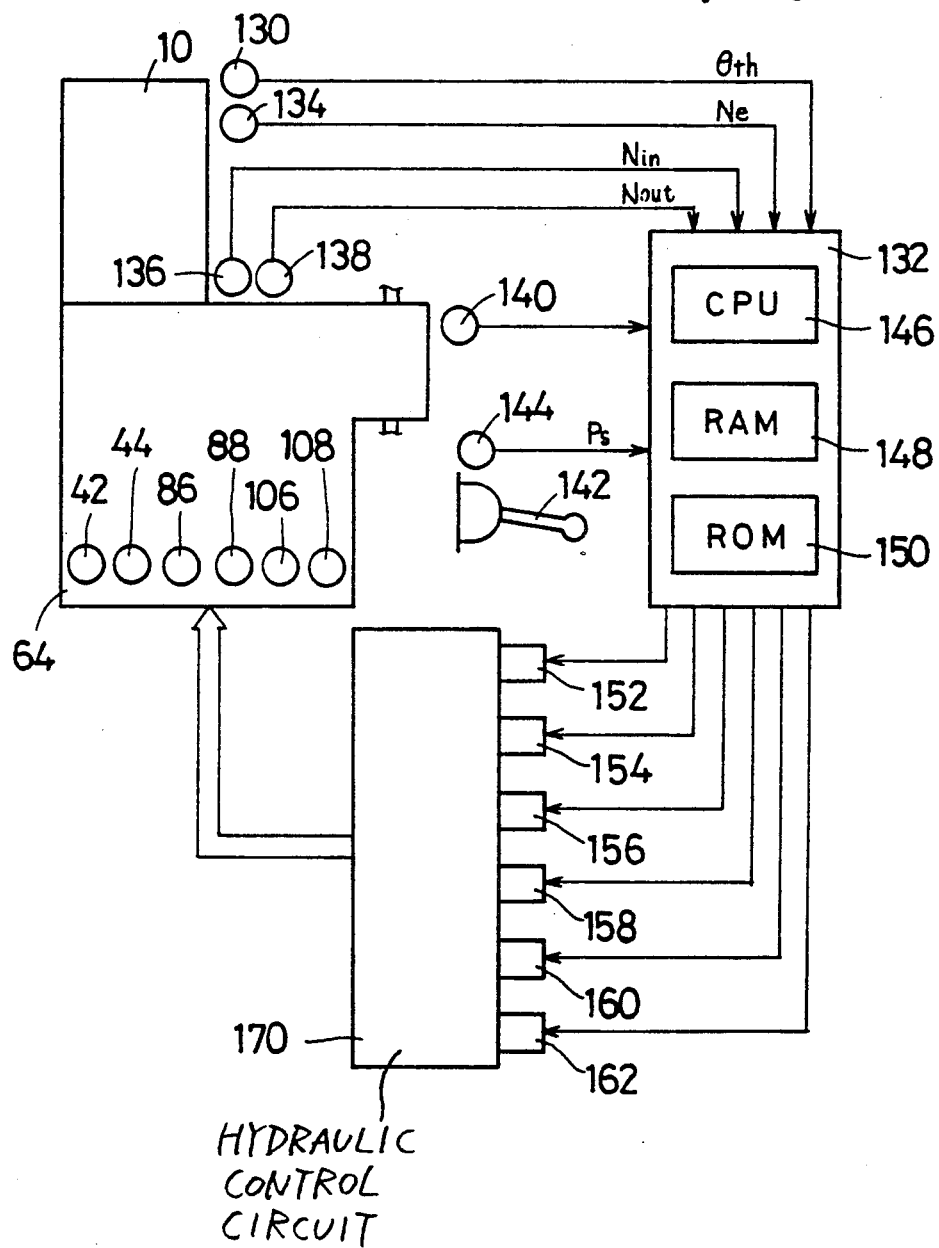
FIG. 2 is a block diagram showing the hydraulic control apparatus adapted to control the power transmitting system of FIG. 1.

Referring first to FIG. 1, there is illustrated a transverse transaxle for a front engine front drive (FF) vehicle, which is controlled by one embodiment of a hydraulic control apparatus of the present invention constructed as shown in FIG. 2. In FIG. 1, the power of the engine 10 is transmitted to drive wheels 26, 26, through a fluid coupling 12 equipped with a lock-up clutch 38, a reversing gear mechanism in the form of a reversing device 14 for selecting forward or reverse running of the vehicle, a belt-and-pulley type continuously variable transmission (hereinafter abbreviated as "CVT") 16, an auxiliary transmission 18, a reduction gear device 20, a differential gear device 22 and drive axles 24, 24. The fluid coupling 12, reversing device 14, CVT 16, auxiliary transmission 18, reduction gear device 20 and differential gear device 22 are accommodated in a transaxle housing 64, and constitute a continuously variable power transmitting system connecting the engine 10 and drive axles 24, 24.

The fluid coupling 12 includes: a pump impeller 30 connected to a crankshaft 28 of the engine 10; a turbine impeller 32 which is rotated by means of a working fluid from the pump impeller 30; an output shaft 34 which is fixed to and rotated with the turbine impeller 32; the lock-up clutch 38 indicated above, which is fixed to the output shaft 34 through a damper 36; and means for defining a releasing chamber 46 and an engaging chamber 48. The pump impeller 30 is connected to an oil pump 40 adapted for generating a fluid pressure used for operating various hydraulic actuators. The lock-up clutch 38 is released or disengaged when the working fluid is fed into the releasing chamber 46 while the fluid is discharged from the engaging chamber 48. When the working fluid is fed into the engaging chamber 48 while the fluid is discharged from the releasing chamber 46, the fluid coupling 12 is operated to effect engagement of the lock-up clutch 38 for direct connection of the crankshaft 28 to the output shaft 34.

The reversing device 14 is disposed on one of opposite sides of the CVT 16 remote from the fluid coupling 12, and is selectively placed in a forward gear position for running the vehicle in the forward direction, and a reverse gear position for running the vehicle in the reverse direction, depending upon a currently selected operating position of a shift lever 142 (which will be described). The reversing device 14 is a well known double-pinion type planetary gear mechanism, which includes a sun gear 50 which is fixed on the output shaft 34 of the fluid coupling 12 that is passed through an input shaft 58 of the CVT 16; a ring gear 52 disposed concentrically with the sun gear 50; a pair of planetary gears 54, 56 which mesh with one and the other of the sun gear 50 and ring gear 52 and mesh with each other; and a carrier 60 fixed on the input shaft 58 of the CVT 16 and rotatably supporting the planetary gears 54, 56. The reversing device 14 further includes a FORWARD frictionally coupling device in the form of a multiple-disk FORWARD clutch C1 for connecting the sun gear 50 and the carrier 60, and a REVERSE frictionally coupling device in the form of a multiple-disk REVERSE brake B1 for fixing the ring gear 52 to the transaxle housing 64. The FORWARD clutch C1 and REVERSE brake B1 are hydraulically operated frictionally coupling devices, which are engaged and released in controlled manners by respective FORWARD hydraulic actuator 42 and REVERSE hydraulic actuator 44. When the FORWARD clutch C1 is engaged while the REVERSE brake B1 is released, the output shaft 34 is connected to and rotated with the carrier 60, whereby the input shaft 58 of the CVT 16 is rotated with the output shaft 34 of the fluid coupling 12 so as to run the vehicle in the forward direction. When the REVERSE brake B1 is engaged while the FORWARD clutch C1 is released, on the other hand, the rotation of the ring gear 52 is inhibited whereby the input shaft 58 connected to the carrier 60 is rotated in the reverse direction with respect to the output shaft 34, at a speed lower than that of the shaft 34, so as to run the vehicle in the reverse direction. During the reverse running of the vehicle, a speed reduction ratio $\gamma_{FR}$ of the reversing device 14, i.e., the ratio of the speed of the output shaft 34 to the speed of the input shaft 58, is equal to $(-1+Zr/Zs)$, Zr representing the number of teeth of the ring gear 52 while Zs representing the number of teeth of the sing gear 50.

The CVT 16 has a drive side variable-diameter pulley 72 provided on the input shaft 58 indicated above, and a driven side variable-diameter pulley 74 provided on a first output shaft 70 disposed parallel to the input shaft 58. The pulleys 72, 74 are connected by a transmission belt 76. The two pulleys 72, 74 have respective stationary rotors 78, 80 fixed to the respective input and output shafts 58, 70, and respective axially movable rotors 82, 84 which are axially movable on the respective shafts 58, 70 and rotated with these shafts. The movable rotors 82, 84 are axially moved by respective first and second hydraulic actuators 86, 88 disposed behind the rotors 82, 84, so that the effective widths of V grooves of the pulleys 72, 74 or the effective diameters engaging the belt 76 are changed to change a speed ratio $\gamma_{CVT}$ of the CVT 16, where $\gamma_{CVT}=Nin/Nout$, Nin representing the speed of the input shaft 58 while Nout representing the speed of the first output shaft 70.

The auxiliary transmission 18 is a single-pinion type planetary gear mechanism, which includes: a sun gear 90 which is concentrically and rotatably provided on the first output shaft 70; a ring gear 92 fixed on the output shaft 70; a planetary gear 94 which meshes with the sun gear 90 and ring gear 92; and a carrier 98 which rotatably supports the planetary gear 94 and which is fixed on a second output shaft 96. The auxiliary transmission 18 further includes a HIGH-GEAR frictionally coupling device in the form of a multiple-disk HIGH-GEAR clutch C2 for connecting the sun gear 90 and the carrier 98, and a LOW-GEAR frictionally coupling device in the form of a multiple-disk LOW-GEAR brake B2 and a one-way clutch 102, which are disposed in series for fixing the sun gear 90 on the transaxle housing 64. The HIGH-GEAR clutch C2 and LOW-GEAR brake B2 are hydraulically operated frictionally coupling devices, which are engaged and released in controlled manners by respective HIGH-SHIFT hydraulic actuator 106 and LOW-SHIFT hydraulic actuator 108. When the LOW-GEAR brake B2 is engaged to place the auxiliary transmission 18 in its low-gear position or large gear-ratio position, the one-way clutch 102 inhibits the sun gear 90 from rotating in the reverse direction with respect to the ring gear 92 during a positive-torque running of the vehicle wherein the torque is transmitted from the engine 10 to the drive wheels 26, 26, and allows the rotation of the sun gear 90 in the same direction as that of the ring gear 92 during a negative-torque or engine brake running of the vehicle so as to permit the torque to be transmitted from the wheels 26, 26 to the engine 10 through the auxiliary transmission 18. Thus, the auxiliary transmission 18 is placed in the low-gear position when the LOW-GEAR brake B2 is engaged while the HIGH-GEAR clutch C2 is released. In this state, when the first output shaft 70 of the CVT 16 is rotated in the direction for running the vehicle in the forward direction, the carrier 98 and the second output shaft 96 are rotated in the same direction as that of the first output shaft 70, at a speed lower than that of the shaft 70, with a speed reduction ratio $\gamma_{AT}$, i.e., the ratio of the speed of the first output shaft 70 to the speed of the second output shaft 96, being equal to $1+Zs/Zr$, Zs representing the number of teeth of the sun gear 90 while Zr representing the number of teeth of the ring gear 92.

When the HIGH-GEAR clutch C2 is engaged while the LOW-GEAR brake B2 is released, on the other hand, the auxiliary transmission 18 is placed in its high-gear position or small gear-ratio position. In this position, the carrier 98 is rotated with the sun gear 90 so that the gear train of the planetary gear mechanism is rotated as a unit, whereby the second output shaft 96 is rotated in the same direction as that of the first output shaft 70 at the same speed, with the speed reduction ratio $\gamma AT$ being equal to "1". The auxiliary transmission 18 may be shifted up to the high-gear position during forward running of the vehicle, by engaging the HIGH-GEAR clutch C2 while the LOW-GEAR brake B2 is held in its engaged position.

The reduction gear device 20 includes: a first gear 110 fixed on the second output shaft 96; a second gear 114 which is fixed on an intermediate shaft 112 and which meshes with the first gear 110; and a third gear 118 which is fixed on the intermediate shaft 112 and which meshes with a large-diameter gear 116 of the differential gear device 22. The intermediate shaft 112 is rotatably provided on an axis c which is parallel to an axis b of the second output shaft 112. The second gear 114 has a larger diameter than the first gear 110, and the third gear 118 has a smaller diameter than the second gear 114. The differential gear device 22 includes a pair of differential small gears 120 which are rotatable about an axis perpendicular to the drive axles 24 and which are rotated with the large-diameter gear 116, and a pair of differential large gears 122 which mesh with the differential small gears 120 and are connected to the drive axles 24, 24. In this arrangement, the power transmitted from the reduction gear device 20 is evenly distributed to the drive axles 24, 24, and then transmitted to the front drive wheels 26, 26.

Referring next to FIG. 2, an electronic control device 132 receives various signals from various sensors, such as: a THROTTLE sensor 130 disposed in a suction pipe of the engine 10, and generating a throttle signal indicative of an angle θth of opening of a throttle valve of the engine 10; an ENGINE SPEED sensor 134 disposed in an igniter of the engine 10, and generating a signal indicative of a speed Ne of the engine 10; an INPUT SHAFT speed sensor 136 and an OUTPUT SHAFT speed sensor 138 disposed in the transaxle housing 64, and generating a signal indicative of the rotating speed Nin of the input shaft 58 of the CVT 16 and a signal indicative of the rotating speed Nout of the first output shaft 70 of the CVT 16, respectively; a VEHICLE SPEED sensor 140 disposed in the housing 64 to detect the rotating speed of the drive axles 24, and generating a signal representative of the speed of the front drive wheels 26, i.e., the running speed SPD of the vehicle; and a SHIFT LEVER sensor 144 generating a signal representative of the currently selected operating position Ps of the shift lever 142.

The electronic control device 132 includes a so-called microcomputer which incorporates a central processing unit (CPU) 146, a random-access memory (RAM) 148, a read-only memory (ROM) 150 and an interface (not shown). The CPU 146 of the electronic control device 132 processes the input signals as indicated above according to control programs stored in the ROM 150, while utilizing a temporary data storage function of the RAM 148, and applies appropriate drive or control signals to first, second, third, fourth, fifth and sixth solenoid-operated valves 152, 154, 156, 158, 160 and 162, so as to control the speed ratio of the CVT 16, the operating state of the lock-up clutch 38 of the fluid coupling 12, and the shifting of the auxiliary transmission 18.

FIG. 3 indicates a relationship between the operating states of the FORWARD clutch C1 and REVERSE brake B1 and the HIGH-GEAR clutch C2 and LOW-GEAR brake B2, and the operating positions (REVERSE "R", NEUTRAL "N" and DRIVE "D") of the shift lever 142 and the gear positions of the auxiliary transmission 18. When the shift lever 142 is placed in the NEUTRAL position, the FORWARD clutch C1 and REVERSE brake B1 of the reversing device 14 are both released whereby the power transmission line between the engine 10 and the drive wheel 26, 26 is disconnected at the reversing device 14. Therefore, the operating states of the HIGH-GEAR clutch C2 and LOW-GEAR brake B2 of the auxiliary transmission 18 do not make any difference. However, the HIGH-GEAR clutch C2 is placed in its engaged position while the shift lever 142 is placed in the NEUTRAL position "N", since the shifting from the NEUTRAL position "N" to the REVERSE or DRIVE position "R", "D" can be easily accomplished by engaging only one frictionally coupling device, that is, the REVERSE brake B1 or the FORWARD clutch C1. As shown in FIG. 3, the LOW-GEAR brake B2 is engaged and the HIGH-GEAR clutch C2 is released a given period of time after the shift lever 142 is operated from the NEUTRAL position "N" to the DRIVE position "D", so as to avoid squatting of the vehicle when it is started.

The vehicle power transmitting system as shown in FIG. 1 is hydraulically controlled by a hydraulic control circuit 170 (FIG. 2), which is shown in detail in FIGS. 4, 5, 6 and 7.

Figure 5:
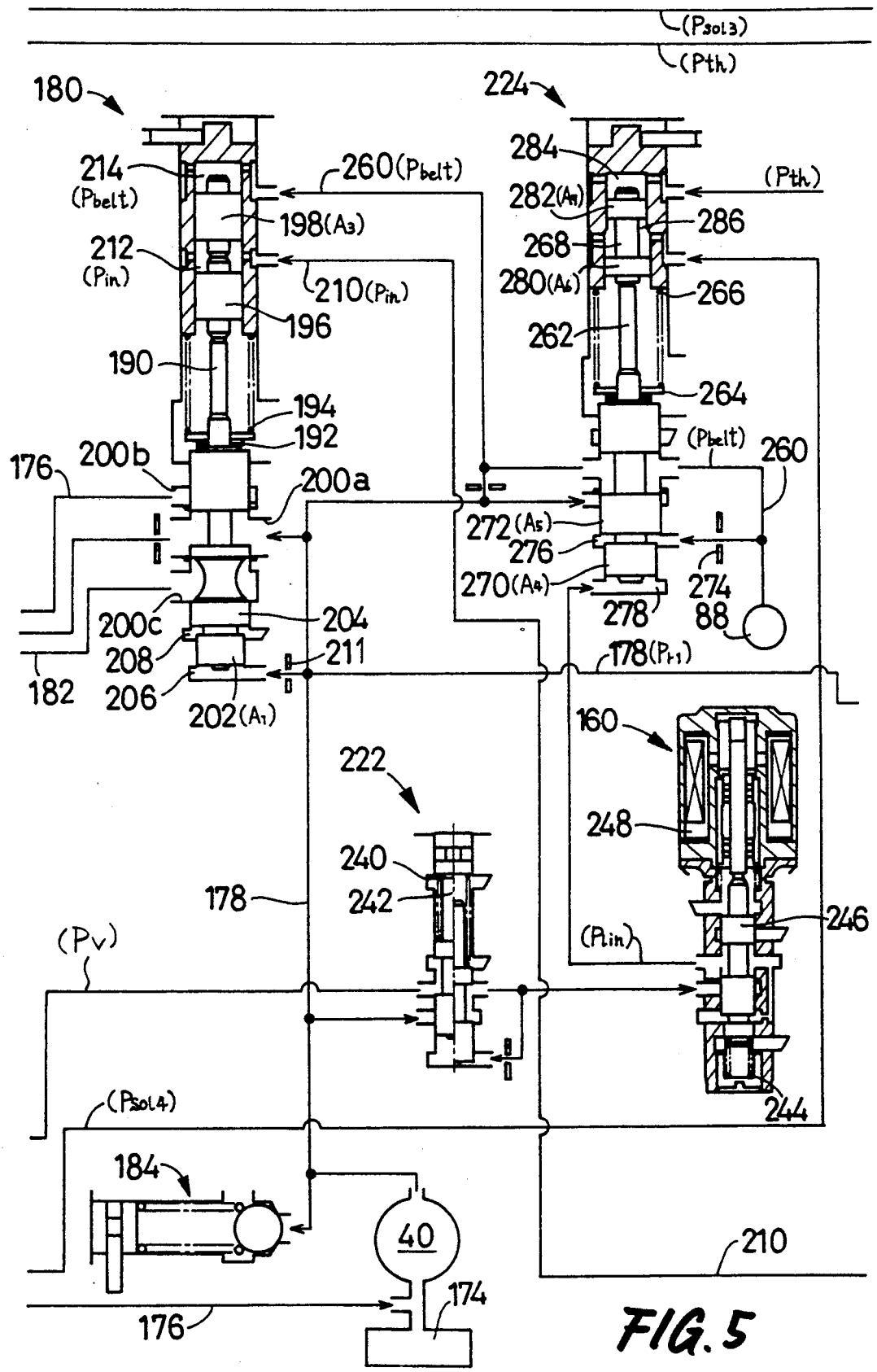
FIG. 5 is a view illustrating another part of the hydraulic control circuit of the hydraulic control apparatus of FIG. 2.

Referring to FIG. 5, the above-indicated oil pump 40 serves as a hydraulic power source of the hydraulic control circuit 170. In operation, the oil pump 40 pumps up a working fluid through a strainer 174 from a reservoir to which the fluid is returned. The pump 40 also communicates with a return line 176, so that the fluid returned through the return line 176 is sucked into the pump 40. The pressurized fluid produced by the pump 40 is delivered as a first line pressure Pr1 into a first pressure line 178. The first line pressure Pr1 is regulated by an overflow or relief type first pressure regulating valve 180, which discharges the fluid in the first pressure line 178 into the return line 176 and a clutch pressure line 182. In FIG. 5, reference numeral 184 denotes a relief valve adapted for preventing an excessive rise of the first line pressure Pr1 in the first pressure line 178.

The first pressure regulating valve 180 includes a valve spool 190, a spring sheet 192, a return spring 194, a first plunger 196 adapted to abut on the valve spool 190, and a second plunger 198 adapted to abut on the first plunger 196 and having the same diameter as the first plunger 196. The biasing force of the return spring 194 acts on the valve spool 190 through the spring sheet 192 so as to bias the spool 190 toward its closed position. The valve spool 190 is operated to effect selective connection and disconnection of a port 200a communicating with the first pressure line 178, to and from a drain port 200b communicating with the return line 176 or a port 200c communicating with the clutch pressure line 182. The valve spool 190 has a first land 202 at one axial end thereof, a second land 204 having a larger diameter than the first land 202, and a chamber 206 which is partially defined by an axial end face of the first land 202. The first line pressure Pr1 is applied as a feedback pressure to the chamber 206 through a flow restrictor 211, so that the valve spool 190 is biased toward its open position. Between the first and second lands 202, 204, there is formed a chamber 208 which is exposed to the atmosphere. Between the first and second plungers 196, 198 which are disposed in coaxial relationship with the valve spool 190, there is formed a chamber 212 which receives a pressure Pin in the first hydraulic actuator 86 through a branch line 210. Adjacent to an axial end face of the second plunger 198, there is formed a chamber 214 which receives a belt tensioning pressure Pbelt (which will be described). The valve spool 190 is positioned under equilibrium of forces according to the following equation (1):

$$Pr1 = [(Pin \text{ or } Pbelt) \cdot A3 + W]/A1 \tag{1}$$

where

A1: pressure-receiving area of the first land 202 of the valve spool 190

A3: cross sectional area of the first plunger 196 or second plunger 198

W: biasing force of the return spring 194

The first line pressure Pr1 thus regulated by the first pressure regulating valve 180 is applied to a throttle sensing valve 220 (FIG. 6) for producing a THROTTLE pressure Pth, a valve pressure regulating valve 222 (FIG. 5) for regulating a VALVE pressure Pv to be applied to the third, fourth and fifth solenoid-operated valves 156, 158, 160, a belt tensioning pressure regulating valve 224 (FIG. 5) for regulating the belt tensioning pressure Pbelt, and to an ENGAGING pressure regulating valve 226 (FIG. 6) for regulating an ENGAG- ING pressure Pbc used to engage the FORWARD clutch C1 or REVERSE brake B1.

In the first pressure regulating valve 180, when the pressure Pin in the first hydraulic actuator 86 is higher than the belt tensioning pressure Pbelt (which is normally equal to a pressure Pout in the second hydraulic actuator 98), the first and second plungers 196, 198 are separated from each other, and a thrust due to the pressure Pin in the first hydraulic actuator 86 acts on the valve spool 190 in the direction toward the closed position. When the pressure Pin is lower than the belt tensioning pressure Pbelt, on the other hand, the first and second plungers 196, 198 are held in abutting contact with each other, whereby a thrust due to the belt tensioning pressure Pbelt acting on the end face of the second plunger 198 acts on the valve spool 190 in the direction toward its closed position. That is, a thrust force based on the higher one of the pressure Pin and the belt tensioning pressure Pbelt acts on the valve spool 190 so as to bias the spool 190 toward the closed position. According to this arrangement, the first line pressure Pr1 is regulated into an optimum level based on the higher one of the pressure Pin and Pbelt, to assure a minimum loss of power for driving the oil pump 40.

Figure 6:
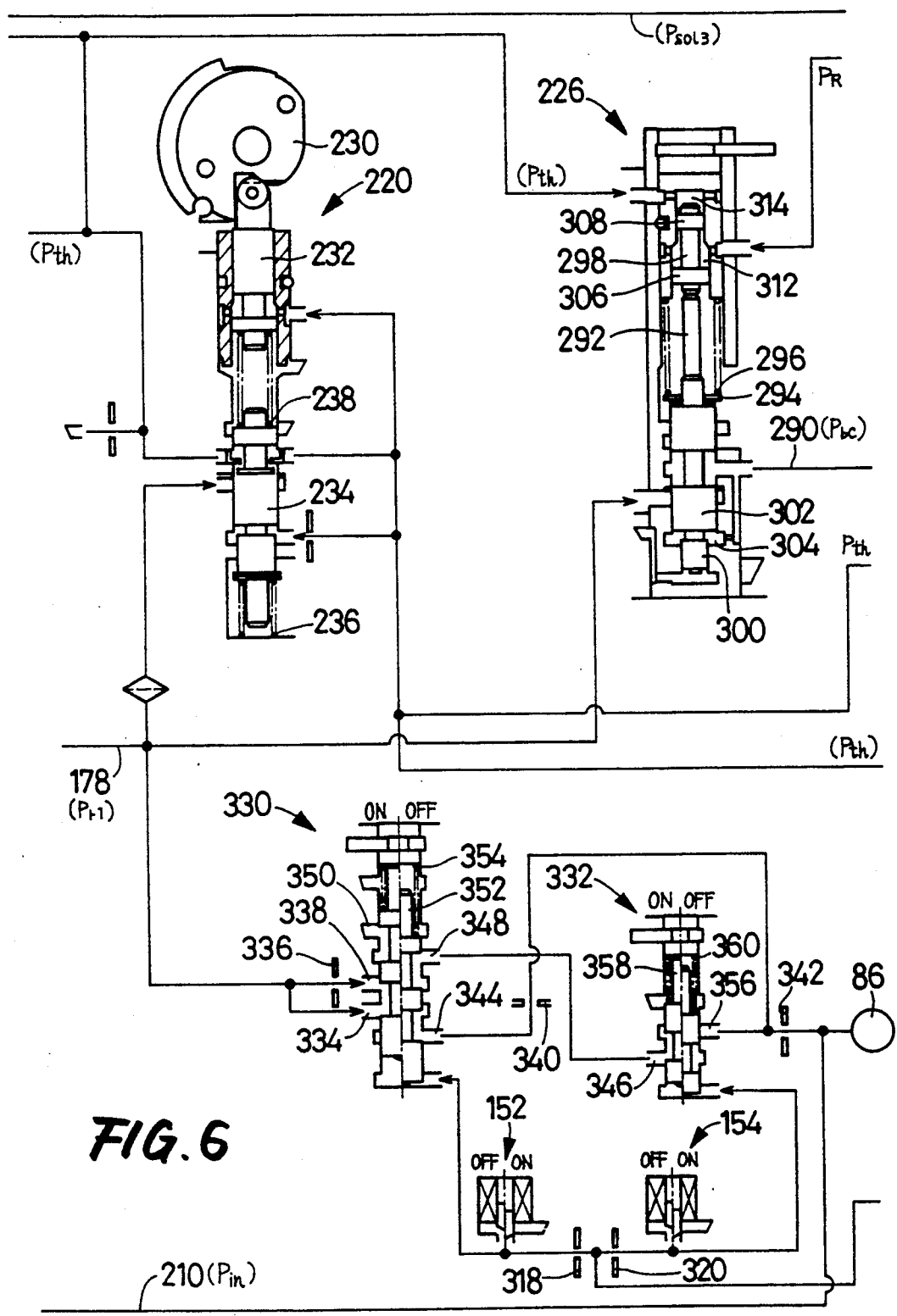
FIG. 6 is a view illustrating a still another part of the hydraulic control circuit of the hydraulic control apparatus of FIG. 2.

Referring to FIG. 6, the above-indicated throttle sensing valve 220 includes: a cam 230 rotated as the accelerator pedal is depressed to open the throttle valve of the engine 10; a plunger 232 which engages a cam surface of the cam 230 and which is axially moved by a distance corresponding to an angle of rotation of the cam 230; a valve spool 234 adapted to regulate the THROTTLE pressure Pth; and a spring 236 which biases the valve spool 234 toward its closed position. The valve spool 234 receives a thrust through a spring 238 from the plunger 232, the biasing force of the spring 236, and a thrust due to the THROTTLE pressure Pth as a feedback pressure. The thrust force from the plunger 232 acts on the valve spool 234 in the direction toward its open position, while the biasing force of the spring 236 and the THROTTLE pressure Pth act on the spool 234 in the direction toward the closed position. The valve spool 234 is moved to a position of equilibrium of the above three forces, whereby the first line pressure Pr1 is reduced so as to produce the THROTTLE pressure Pth corresponding to the actual opening angle 0th of the throttle valve.

Referring back to FIG. 5, the above-indicated valve pressure regulating valve 222 includes a valve spool 242, and a spring 240 which biases the spool 242 toward its open position. The valve spool 242 is moved to a position of equilibrium of the biasing force of the spring 240, and a thrust force based on the VALVE pressure Pv as a feedback pressure which acts on the spool 242 in the direction toward its closed position. This regulating valve 222 reduces the first line pressure Pr1 to produce a constant VALVE pressure irrespective of variation of the first line pressure Pr1. The VALVE pressure Pv thus regulated by the valve 222 is applied to the third, fourth and fifth solenoid-operated valves 156, 158 (FIG. 4) and 160 (FIG. 5). The third and fourth solenoid-operated valves 156, 158 are of a type which has three ports, i.e., an input port receiving the VALVE pressure Pv, a drain port and an output port, and two operating positions. Namely, the valve 156, 158 is selectively placed in an on position for fluid communication between the input and output ports with the drain port closed by a ball-like spool, and an off position for fluid communication between the output and drain ports with the input port closed by the ball-like spool. The fifth solenoid-operated valve 160 has a valve spool 246 which is biased by a spring 244 and a feedback pressure toward its closed position, and a linear solenoid coil 248 which is energized by a drive signal received from the electronic control device 132 to produce a thrust to bias the spool 246 toward its open position. This fifth solenoid-operated valve 160 is adapted to generate a pilot pressure Plin which is continuously increased with an increase in the drive signal applied to the solenoid coil 248.

The above-indicated belt tensioning pressure regulating valve 224 (FIG. 5) includes: a valve spool 262 for effecting connection and disconnection of the first pressure line 178 for the first line pressure Pr1 to and from a line 260 for the belt tensioning pressure Pbelt; a spring sheet 264; a return spring 266; and a plunger 268. The return spring 266 applies its biasing force to the valve spool 262 through the spring sheet 264, to bias the spool 262 in the direction toward its open position. The plunger 268 is adapted to abut on the valve spool 262 so as to bias the spool 262 toward the open position. The valve spool 262 is provided at one axial end portion thereof remote from the plunger 268, with a first land 270, and a second land 272 having a larger diameter than the first land 270. Between the first and second lands 270, 272, there is formed a chamber 276 which receives the belt tensioning pressure Pbelt as a feedback pressure through a flow restrictor 274. Another chamber 278 is formed adjacent to the first land 270 at the above-indicated one axial end of the valve spool 262. To this chamber 278 is applied the above-indicated pilot pressure Plin generated by the fifth solenoid-operated valve 160, so that the valve spool 262 is biased toward its closed position, based on the current speed ratio $\gamma_{CVT}$ of the CVT 16. The plunger 268 has a third land 280 at one axial end portion thereof nearer to the valve spool 262, and a fourth land 282 at the other axial end portion, which has a smaller diameter than the third land 280. A chamber 284 is partially defined by an axial end face of the fourth land 282, for receiving the THROTTLE pressure Pth which serves to bias the valve spool 262 toward the open position. Between the third and fourth lands 280, 282, there is formed a chamber 286 adapted to receive a pilot pressure Pso14 that is generated by the fourth solenoid-operated valve 158. When the pilot pressure Pso14 is applied to the chamber 286, the valve spool 262 is biased toward the open position so as to raise the belt tensioning pressure Pbelt by a predetermined level. Accordingly, the valve spool 262 is positioned under equilibrium of forces according to the following equation (2):

$$Pbelt = [A7 \cdot Pth + (A6 - A7)Pso14 + W - A4 \cdot Plin]/(A5 - A4) \quad (2)$$

where,
A4: pressure-receiving area of the first land 270
A5: cross sectional area of the second land 272
A6: cross sectional area of the third land 280
A7: pressure-receiving area of the fourth land 282
W: biasing force of the return spring 266

Namely, the valve spool 262 is axially moved according to the equation (2), so as to reduce the first line pressure Pr1 to produce the belt tensioning pressure Pbelt to be applied to the second hydraulic actuator 88. Since the belt tensioning pressure Pbelt is basically regulated, based on the speed ratio $\gamma_{CVT}$ of the CVT 16 and the throttle opening angle $\theta$th corresponding to the required output torque of the engine 10, the tension of the belt 76, i.e., the force of the belt 76 engaging the pulleys 72, 74, is optimally controlled to a required minimum value, causing a significantly reduced power loss at the CVT 16 and assuring improved durability of the belt 76.

Figure 4:
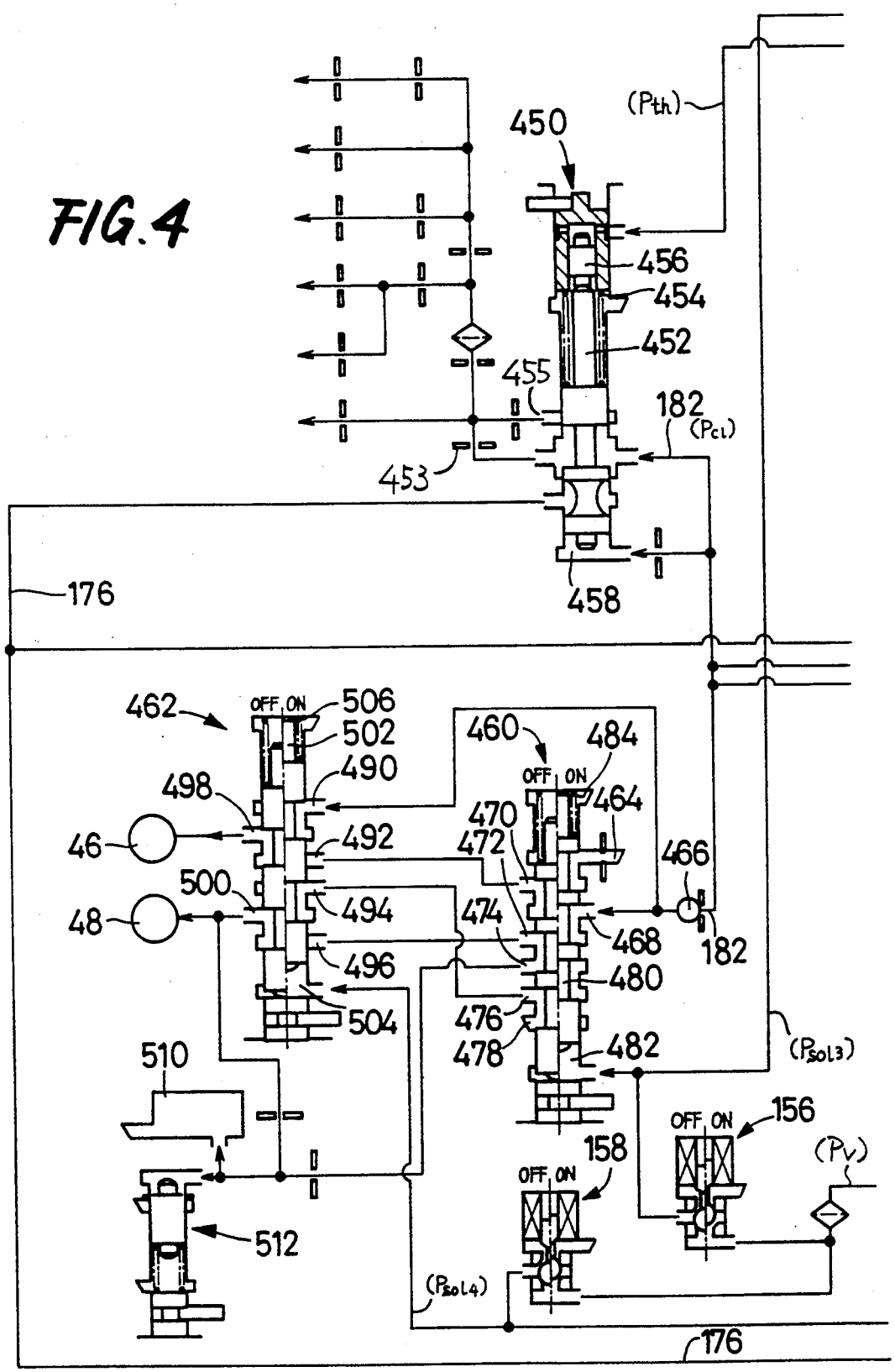
FIG. 4 is a view illustrating a part of a hydraulic control circuit of the hydraulic control apparatus of FIG. 2.

Referring to FIG. 6, the engaging pressure regulating valve 226 includes: a valve spool 292 for effecting connection and disconnection of the first pressure line 178 to and from an engaging pressure line 290; a spring sheet 294; a return spring 296 for biasing the valve spool 292 toward its open position through the spring sheet 294; and a plunger 298 which is in abutting contact with the valve spool 292. The valve spool 292 is provided at one axial end portion thereof remote from the plunger 298, with a first land 300, and a second land 302 having a larger diameter than the first land 300. Between the first and second lands 300, 302, there is formed a chamber 304 which receives the above-indicated ENGAGING pressure Pbc as a feedback pressure The plunger 298 has a third land 306 at one axial end portion thereof nearer to the valve spool 292, and a fourth land 308 at the other axial end portion, which has a smaller diameter than the third land 306. Between the third and fourth lands 306, 308, there is formed a chamber 312 adapted to receive a R-shift pressure $P_R$ which is generated by a manual valve 310 (which will be described) when the shift lever 142 is placed in the REVERSE position "R". The fourth land 308 has an axial end face which partially defines a chamber 314 adapted to receive the THROTTLE pressure Pth. A thrust based on the THROTTLE pressure Pth or a thrust based on the THROTTLE pressure Pth and R-shift pressure $P_R$ as well as the biasing force of the spring 296 acts on the valve spool 292 in the direction toward its open position, while a thrust based on the feedback pressure acts on the valve spool 292 in the direction toward its closed position. Thus, the valve spool 292 is moved to a position of equilibrium of these forces, to produce the ENGAGING pressure Pbc which is increased with an increase in the THROTTLE pressure Pth representing the required output torque of the engine 10. The ENGAGING pressure Pbc is also increased by a predetermined level when the R-shift pressure $P_R$ is applied to the chamber 312, that is, when the shift lever 142 is operated to the REVERSE position "R". The thus regulated ENGAGING pressure Pbc produces a minimum thrust force required for engaging the FORWARD clutch C1, REVERSE brake B1, HIGH-GEAR clutch C2 or LOW-GEAR brake B2. This ENGAGING pressure Pbc is applied to the first, second and sixth solenoid-operated valves 152, 154 and 162. The sixth solenoid-operated valve 162 (FIG. 7) is of the same type as the third and fourth solenoid-operated valves 156, 158 (FIG. 4). The first and second solenoid-operated valves 152, 154 (FIG. 6) are of a type having two ports and two operating positions. That is, when the valve 152, 154 is off, the pressure downstream of the corresponding flow restrictor 318, 320 is released to a drain through the valve 152, 154. When the valve 152, 154 is on, the pressure downstream of the flow restrictor 318, 320 is maintained at the ENGAGING pressure Pbc.

The first solenoid-operated valve 152 controls a directional control valve 330 for changing the speed ratio $\gamma_{CVT}$ of the CVT 16, while the second solenoid-operated valve 154 controls a flow control valve 332 for controlling the rate of change of the speed ratio $\gamma_{CVT}$ of the CVT 16. The directional control valve 330 has a first input port 334 communicating with the first pressure line 178, a second input port 338 communicating with the first pressure line 178 through a medium-size restrictor 336, a first output port 344 connected to the first hydraulic actuator 86 through a relatively small restrictor 340 and a relatively large restrictor 342, a second output port 348 connected to an input port 346 of the flow control valve 332, and a drain port 350. This control valve 330 includes a valve spool 352 which has an OFF position for fluid communication between the first input port 334 and first output port 344 and between the second input port 338 and second output port 348, and an ON position for fluid communication between the second output port 348 and the drain port 350. The control valve 330 further includes a spring 354 for biasing the valve spool 352 toward the OFF position. When the first solenoid-operated valve 152 is off, the valve spool 352 is placed in the OFF position so that the fluid in the first pressure line 178 is fed into the first hydraulic actuator 86 so as to place the CVT 16 in a shift-up mode wherein the speed-ratio $\gamma_{CVT}$ is reduced to increase the vehicle speed SPD. When the first solenoid-operated valve 152 is on, on the other hand, the valve spool 352 is placed in the ON position so that the fluid in the first hydraulic actuator 86 is discharged to the drain port 350, to thereby place the CVT 16 in a shift-down mode wherein the speed ratio $\gamma_{CVT}$ is increased to reduce the vehicle speed SPD.

Figure 8:
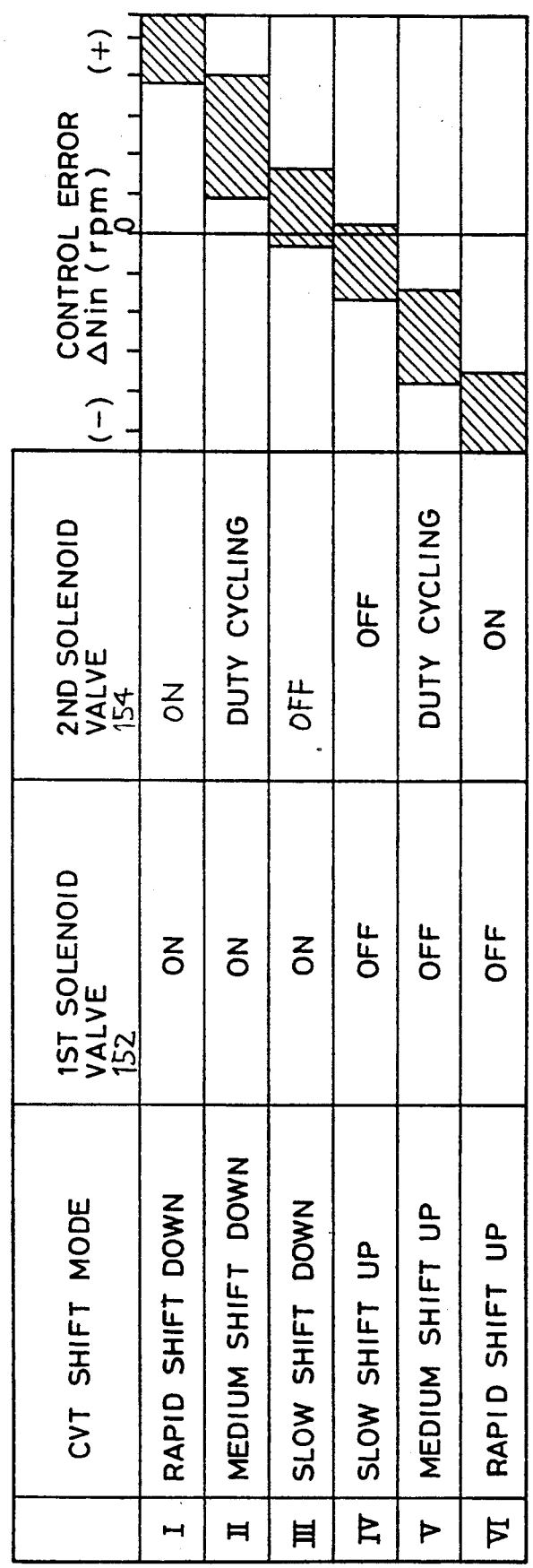
FIG. 8 is a view indicating a relationship between on-off states of a first and a second solenoid-operated valve of the hydraulic control circuit of FIG. 6 and a shifting mode of the CVT.

The flow control valve 332 has the above-indicated input port 346, and an output port 356 communicating with the first hydraulic actuator 86. This control valve 332 includes a valve spool 358 which has an ON position for connecting the input port 346 to the output port 356, and an OFF position for disconnecting the input port 346 from the output port 356. The control valve 332 further includes a spring 360 for biasing the valve spool 358 toward the OFF position. When the second solenoid-operated valve 154 is in the off position wherein the input port 346 is disconnected from the output ports 356, the CVT 16 is placed in a slow shift-down mode when the first solenoid-operated valve 152 is on, and in a slow shift-up mode when the valve 152 is off. When the second solenoid-operated valve 154 is in the on position wherein the input port 346 communicates with the output port 356, the CVT 16 is placed in a rapid shift-up mode when the first solenoid-operated valve 152 is off, and in a rapid shift-down mode when the valve 152 is on. FIG. 8 indicates the shifting modes of the CVT 16 which are established by appropriate combinations of the operating states of the first and second solenoid-operated valves 152, 154.

Figure 7:
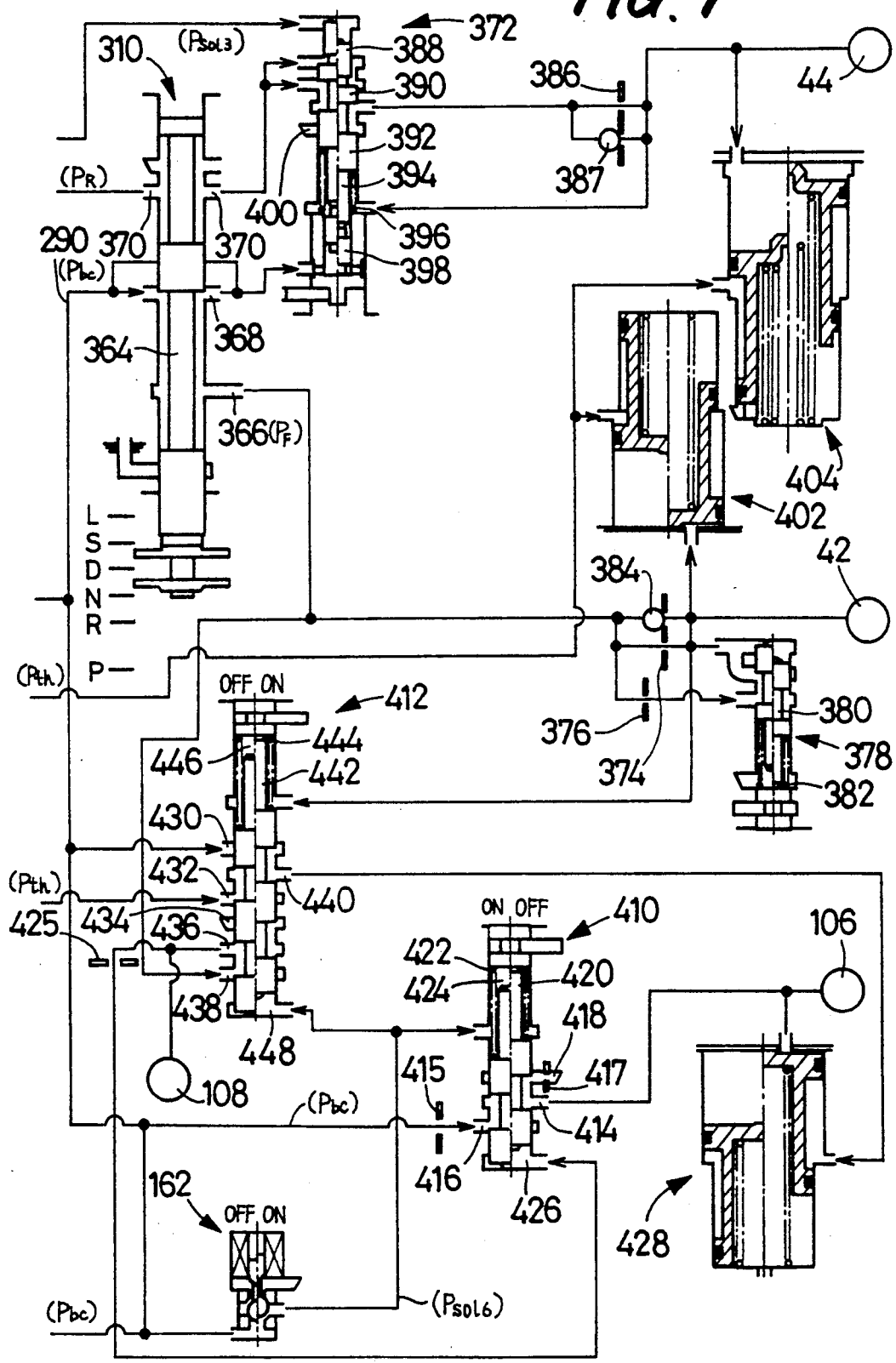
FIG. 7 is a view illustrating a further part of the hydraulic control circuit of the hydraulic control apparatus of FIG. 2.

Referring to FIG. 7, the above-indicated manual valve 310 has a valve spool 364 which is moved in response to the operation of the shift lever 142, which has six operating positions, i.e., LOW "L", SECOND "S", DRIVE "D", NEUTRAL "N", REVERSE "R", and PARKING "P". This manual valve 310 has a first port 366, a second port 368 and a third port 370. To the second port 368 is applied the ENGAGING pressure Pbc regulated by the engaging pressure regulating valve 226. The manual valve 310 delivers a L/S/D-shift pressure $P_F$ from the first port 366 when the shift lever 142 is placed in one of the LOW, SECOND and DRIVE positions "L", "S" and "D", and delivers the R-shift pressure $P_R$ from the third port 370 when the shift lever 142 is placed in the REVERSE position "R".

The L/S/D-shift pressure $P_F$ delivered from the first port 366 is fed to the FORWARD actuator 42 through a flow restrictor 374, or through a flow restrictor 376 and a shift timing valve 378. The shift timing valve 378 has a valve spool 380 which is moved against the biasing action of a spring 382 as the pressure in the FORWARD actuator 42 increases, so as to restrict the fluid flow into the actuator 42. When the shift lever 142 is operated to a position other than the LOW, SECOND and DRIVE positions "L", "S" and "D", the fluid in the FORWARD actuator 42 is rapidly discharged through a check valve 384 and manual valve 310.

When the shift lever 142 is placed in the REVERSE position "R", the R-shift pressure $P_R$ delivered from the third port 370 is fed to the REVERSE actuator 44 through a REVERSE INHIBIT valve 372 and a flow restrictor 386, and is also fed to the chamber 312 of the engaging pressure regulating valve 226 (FIG. 6). When the shift lever 142 is placed in a position other than the REVERSE position, the fluid in the REVERSE actuator 44 is rapidly discharged through a check valve 387, REVERSE INHIBIT valve 372 and manual valve 310, whereby the R-shift pressure $P_R$ is lowered to the atmospheric pressure.

The REVERSE INHIBIT valve 372 as shown in FIG. 7 includes a valve spool 394 which has a first land 388, a second land 390 having a larger diameter than the first land 388, and a third land 392 having the same diameter as the second land 390. The valve spool 394 is moved between an open position in which the third port 370 of the manual valve 310 is connected to the REVERSE actuator 44, and a closed position in which the third port 370 is disconnected from the actuator 44 by the second land 390. This valve 372 further includes a spring 396 for biasing the valve spool 394 toward the open position, and a plunger 398 which abuts on the valve spool 394 to bias the spool 394 toward the open position. The plunger 398 has a cross sectional area which is equal to a difference between the cross sectional areas of the first and second lands 388, 390. The first land 388 is adapted to receive at its one end face remote from the second land 390, a pilot pressure $Pso13$ which is generated by the third solenoid-operated valve 156 when placed in the on position, i.e., when the lock-up clutch 38 is engaged. The R-shift pressure $P_R$ is applied to a chamber formed between the first and second land 388, 390. Further, the ENGAGING pressure $Pbc$ is always applied to one end face of the plunger 398 remote from the valve spool 394, and the pressure of the fluid in REVERSE actuator 44 is applied to between the valve spool 394 and the plunger 398. In this arrangement, a thrust due to the R-shift pressure $P_R$ for biasing the valve spool 394 toward the open position is compensated with a thrust due to the ENGAGING pressure $Pbc$ for biasing the spool 394 toward the closed position. Therefore, when the shift lever 142 is operated to the REVERSE position "R", the valve spool 394 is placed in the open position under the biasing force of the spring 396. Upon application of the pilot pressure $Pso13$, the valve spool 394 is placed in the closed position, i.e., a reverse inhibit position According to this arrangement, when the shift lever 142 is operated to the REVERSE position "R" while the vehicle is running in the forward direction with the lock-up clutch 38 being engaged, the valve spool 394 is moved to the closed position due to the pilot pressure $Pso13$ applied thereto, whereby the REVERSE actuator 44 is connected to a drain port 400 of the REVERSE INHIBIT valve 372 so as to inhibit engagement of the REVERSE brake B1. However, once the R-shift pressure $P_R$ is applied to the REVERSE actuator 44, a thrust based on the R-shift pressure $P_R$ acts on the valve spool 394 in the direction toward the open position, so that the spool 394 is held in the open position even if the pilot pressure $Pso13$ is applied to the spool 394.

Accumulators 402, 404 are connected to the FORWARD actuator 42 and REVERSE actuator 44, respectively. These accumulators 402, 404 receive as back pressures the THROTTLE pressure $Pth$ so as to lower the rate of increase in the pressures in the respective hydraulic actuators 42, 44 as the transmitted torque increases, so that the FORWARD clutch C1 and REVERSE brake B1 are smoothly engaged.

The sixth solenoid-operated valve 162 is adapted to produce a pilot pressure $Pso16$ to be applied to an C2 control valve 410 and a B2 control valve 412, which are operated to place the respective HIGH-GEAR clutch C2 and LOW-GEAR brake B2 of the auxiliary transmission 18 in the engaged or disengaged position. The C2 control valve 410 has an output port 414 communicating with the HIGH-SHIFT actuator 106, a port 416 to which is applied the ENGAGING pressure $Pbc$ through a flow restrictor 415, and a drain port 418 through which the fluid is drained through a flow restrictor 417. This control valve 410 includes a valve spool 420 for selectively connecting the output port 414 to one of the port 416 and drain port 418, and a spring 422 for biasing the valve spool 422 toward its engaging position for engagement of the HIGH-GEAR clutch C2. The spring 422 is accommodated in a chamber 424 adapted to receive the pilot pressure $Pso16$ from the sixth solenoid-operated valve 162. Another chamber 426 is partially defined by one axial end face of the valve spool 420 remote from the spring 422. To this chamber 426 is applied through a flow restrictor 425 the pressure in the LOW-SHIFT actuator 108. In the thus constructed C2 control valve 410, the valve spool 420 is placed in the engaging position when the chambers 424, 426 are both subjected to the atmospheric pressure, or when the pilot pressure $Pso16$ is applied to the chamber 424 while the pressure in the LOW-SHIFT actuator 108 is applied to the chamber 426. In this case, the HIGH-SHIFT actuator 106 is operated to engage the HIGH-GEAR clutch C2. When the pressure in the LOW-SHIFT actuator 108 is applied to the chamber 426 while the chamber 424 is kept at the atmospheric pressure, on the other hand, the valve spool 420 is placed in its releasing position (corresponding to the OFF position in FIG. 7), so that the fluid is discharged from the HIGH-SHIFT actuator 106 to release or disengage the HIGH-GEAR clutch C2. To the HIGH-SHIFT actuator 106 is connected an accumulator 428, to which is applied as a back pressure the ENGAGING pressure $Pbc$ or THROTTLE pressure $Pth$ through the B2 control valve 412. This accumulator 428 permits the HIGH-GEAR clutch C2 to be smoothly engaged.

The B2 control valve 412 has a first port 430 which receives the ENGAGING pressure $Pbc$, a second port 432 which receives the THROTTLE pressure $Pth$, a drain port 434, a third port 436 which is connected to the LOW-SHIFT actuator 108, a fourth port 438 which receives the L/S/D-shift pressure $P_F$, and a fifth port 440 which is connected to a back pressure chamber of the accumulator 428. The control valve 412 includes a valve spool 442 which is moved to selectively connect the fifth port 440 to one of the first and second ports 430, 432, and connect the third port 436 to one of the drain port 434 and fourth port 438. The valve 412 further includes a spring 444 for biasing the valve spool 442 to its engaging position for engagement of the LOW-GEAR brake B2. The spring 444 is accommodated in a chamber 446 which receives the pressure of the fluid in the FORWARD actuator 42. Another chamber 448 is partially defined by one axial end face of the valve spool 442 remote from the spring 444, for receiving the pilot pressure Pso16 from the sixth solenoid-operated valve 162. In the thus constructed B2 control valve 412, the valve spool 420 is placed in the engaging position when the chambers 446, 448 are both subjected to the atmospheric pressure, or when the pressure in the FORWARD actuator 42 is applied to the chamber 446 while the pilot pressure Pso16 is applied to the chamber 448. In this case, the LOW-SHIFT actuator 108 is operated to engage the LOW-GEAR brake B2. When the pilot pressure Pso16 is applied to the chamber 448 while the chamber 446 is kept at the atmospheric pressure, on the other hand, the valve spool 442 is placed in its releasing position so that the fluid is drained from the LOW-SHIFT actuator 108 to release the LOW-GEAR brake B2.

When the shift lever 142 of the vehicle is operated to the REVERSE position "R" or NEUTRAL position "N", the sixth solenoid-operated valve 162 is placed in the on position as shown in FIG. 3, and the pilot pressure Pso16 is applied to the chamber 424 of the C2 control valve 410, so that the valve spool 420 of the valve 410 is placed in the engaging position (or ON position in FIG. 7) so as to engage the HIGH-GEAR clutch C2. In this state, the LOW-GEAR brake B2 is released irrespective of the operating position of the B2 control valve 412, since the L/S/D-shift pressure $P_F$ is not delivered from the manual valve 310 to the fifth port 438 of the valve 412. Consequently, the auxiliary transmission 18 is placed in the high-gear position for direction connection between the first and second output shafts 70, 96, permitting only the reversing device 14 to disconnect the power transmission line between the engine 10 and drive wheels 26, 26. According to this arrangement, the CVT 16 is rotated even when the shift lever 142 is operated to the NEUTRAL position "N" during running of the vehicle, with the speed ratio $\gamma_{CVT}$ being suitably controlled.

Figure 9:
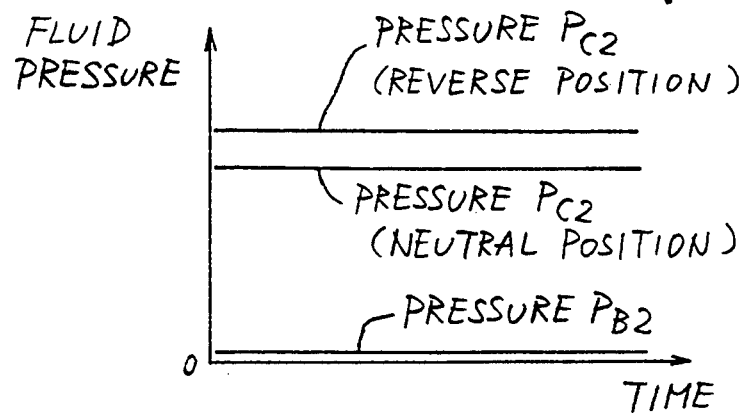
FIG. 9 is a time chart indicating pressures $P_{B2}$ and $P_{C2}$ in the hydraulic control circuit of FIG. 7 as a function of time, when the shift lever is placed in a REVERSE or NEUTRAL position.

As described above, the auxiliary transmission 18 is placed in the high-gear position, that is, the torque is directly transmitted through the auxiliary transmission 18, when the shift lever 142 is placed in the NEUTRAL position "N" or REVERSE position "R". When the shift lever 142 is operated from the NEUTRAL position "N" to the REVERSE or DRIVE position "R", "D", therefore, only one frictionally coupling device, i.e., the FORWARD clutch C1 or REVERSE brake B1, is required to be engaged so as to commence the forward or reverse running of the vehicle, without any complicated timing control for engagement of two or more coupling devices. FIG. 9 indicates the pressure $P_{C2}$ in the HIGH-SHIFT actuator 106 and the pressure $P_{B2}$ in the LOW-SHIFT actuator 108, which are present when the shift lever 142 is placed in the REVERSE position "R" or NEUTRAL position "N". When the shift lever 142 is placed in the REVERSE position "R", the R-shift pressure $P_R$ is applied to the chamber 312 of the engaging pressure regulating valve 226 to increase the ENGAGING pressure Pbc by a predetermined amount, to thereby ensure an engaging force of the HIGH-GEAR clutch C2 sufficient to transmit an appropriate amount of torque through the transmission 18 during the reverse running of the vehicle. Therefore, the pressure $P_{C2}$ generated when the shift lever 142 is in the REVERSE position "R" is higher than the pressure $P_{C2}$ generated when the shift lever 142 is in the NEUTRAL position "N".

Immediately after the shift lever 142 is operated from the NEUTRAL position "N" to the DRIVE position "D", an anti-squat control routine is initiated to slowly change the driving torque to thereby avoid squatting of the vehicle. In this control, the auxiliary transmission 18 is first placed in the high-gear position with the speed reduction ratio $_qAT$ of "1", for a given period of time before it is shifted to the low-gear position. More specifically, under the anti-squat control, the HIGH-GEAR clutch C2 and LOW-GEAR brake B2 are held in the same positions as when the shift lever 142 is placed in the NEUTRAL position "N", as shown in FIG. 3. Namely, the electronic control device 132 holds the sixth solenoid-operated valve 162 in the on position so that the valve spool 420 of the C2 control valve 410 is held in the engaging position (or ON position in FIG. 7), so that the HIGH-GEAR clutch C2 continues to be placed in the engaged position. In this condition, the L/S/D-shift pressure $P_F$ delivered from the manual valve 310 is applied to the FORWARD actuator 42 for engaging the FORWARD clutch C1, and to the chamber 446 of the B2 control valve 412, so that the pressure $P_{C1}$ in the actuator 42 is slowly raised under the function of the flow restrictors 374, 376 and accumulator 402. During the rise of the pressure $P_{C1}$, the pilot pressure Pso16 is applied to the chamber 448 of the B2 control valve 412 so that the valve spool 442 is held in the releasing position (or ON position in FIG. 7), whereby the LOW-SHIFT actuator for the LOW-GEAR brake B2 is kept drained. Thus, the auxiliary transmission 18 is placed in the high-gear position in which only the HIGH-GEAR clutch C2 is engaged.

Figure 10:
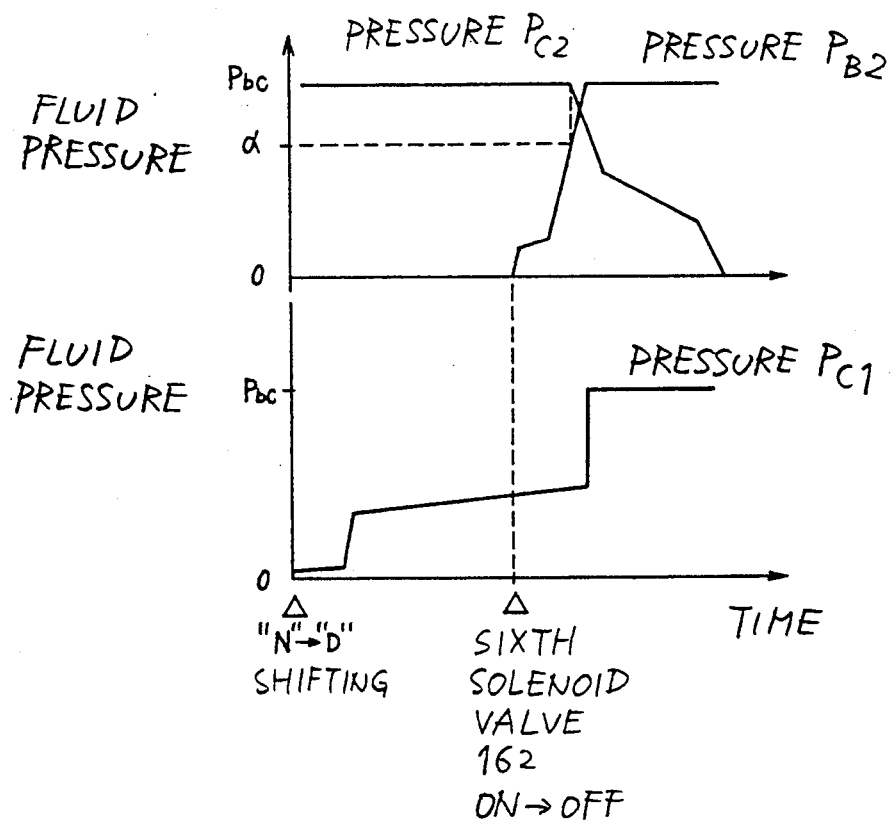
FIG. 10 is a time chart indicating pressures $P_{C1}$, $P_{B2}$ and $P_{C2}$ in the hydraulic control circuit of FIG. 7 as a function of time, upon operating of the shift lever from the NEUTRAL position to DRIVE position.

Upon completion of the engagement of the FORWARD clutch C1 in response to the operation of the shift lever 142 from the NEUTRAL position "N" to the DRIVE position "D", more precisely, at a moment when the rotation of the output shaft 34 is stopped or when about 0.7 second has passed after the start of the above anti-squat control, the electronic control device 132 places the sixth solenoid-operated valve 162 in the off position to terminate the anti-squat control. As a result, the chamber 448 of the B2 control valve 412 to which has been applied the pilot pressure Pso16 receives the atmospheric pressure so that the valve spool 442 is placed in the engaging position (or OFF position in FIG. 7). Consequently, the L/S/D-shift pressure $P_F$ is applied to the LOW-SHIFT actuator 108 so that the LOW-GEAR brake B2 is engaged. At the same time, the chamber 424 of the C2 control valve 410 to which has been applied the pilot pressure Pso16 receives the atmospheric pressure, while the pressure of the fluid in the LOW-SHIFT actuator 108 is applied to the chamber 426 of the C2 control valve 410 through the flow restrictor 425. As a result, the valve spool 420 of the C2 control valve 410 is moved to the releasing position (or OFF position in FIG. 7) against the biasing action of the spring 422, and the HIGH-GEAR clutch C2 is disengaged. Namely, upon completion of the anti-squat control which is temporarily executed in response to the operation of the shift lever 142 from the NEUTRAL position "N" to the DRIVE position "D", the auxiliary transmission 18 is placed in the low-gear position as described above, to ensure a driving force sufficient to start the vehicle. FIG. 10 indicates the pressures $P_{C1}$, $P_{C2}$ and $P_{B2}$ in the hydraulic actuators 42, 106 and 108, respectively, which are varied in response to the operation of the shift lever 142 from the NEUTRAL position "N" to the DRIVE position "D". It is noted that even if the sixth solenoid-operated valve 162 is not turned off but kept on, the valve spool 420 of the B2 control valve 412 is placed in the OFF position of FIG. 7 to engage the LOW-GEAR brake B2, as the pressure $P_{C1}$ for engaging the FORWARD clutch C1 is raised upon operating of the shift lever 142 from the NEUTRAL position "N" to the DRIVE position "D".

For establishment of the low-gear position of the auxiliary transmission 18 after the execution of the above anti-squat control, the valve spool 420 of the C2 control valve 410 is moved to the releasing position, based on the increase in the pressure of the fluid in the LOW-SHIFT actuator 108. As shown in FIG. 10, releasing of the HIGH-GEAR clutch C2 is initiated when the pressure ($=P_{B2}$) for engaging the LOW-GEAR brake B2 is elevated to a predetermined level "$a$" at which this pressure produces a thrust force that corresponds to at least the biasing force (e.g., 2.5–3 kg). of the spring 422. Thus, both of the LOW-GEAR brake B2 and HIGH-GEAR clutch C2 are concurrently engaged for a required minimum period of time, thereby avoiding shift shock which would otherwise occur upon shifting of the auxiliary transmission 18 from the high-gear position to the low-gear position This transient double engagement of the brake B2 and clutch C2 also serves to avoid racing of the engine 10. The size of the flow restrictor 425 and the biasing force of the spring 422 are determined so that the auxiliary transmission 18 is prevented from being noticeably locked due to the transient double engagement, even when the shift lever 142 is operated from the NEUTRAL position "N" to the "DRIVE" position during the reverse running of the vehicle.

Figure 11:
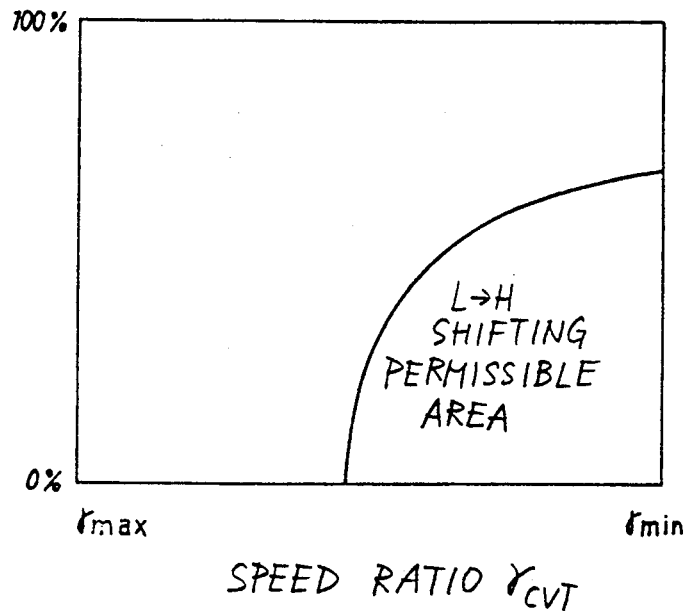
FIG. 11 is a graph indicating a permissible area in which the auxiliary transmission of FIG. 1 is shifted from a low gear position to a high-gear position.
Figure 12:
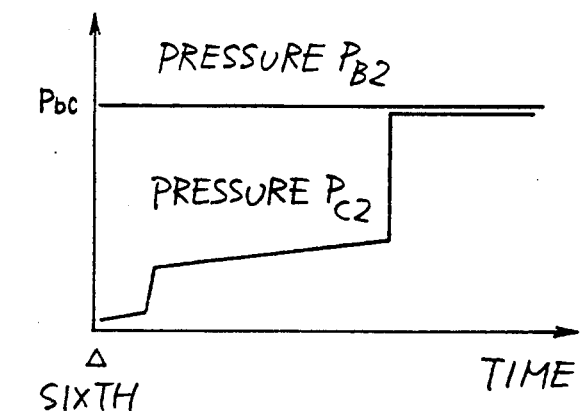
FIG. 12 is a time chart indicating the pressures $P_{B2}$ and $P_{C2}$ as a function of time, when a sixth solenoid-operated valve is turned on while the vehicle is running with the shift lever placed in the DRIVE position.

While the vehicle is running with the auxiliary transmission 18 placed in the low-gear position as described above, the sixth solenoid-operated valve 162 is turned on when the electronic control device 132 determines that the current running condition of the vehicle, as represented by H the throttle opening angle $\theta$th and the speed ratio $\gamma_{CVT}$, comes into a predetermined area as indicated in the graph of FIG. 11, in which area the transmission 18 may be shifted from the low-gear position to the high-gear position, as disclosed in laid-open Publication No. 61-241561 of unexamined Japanese Patent Application. As a result, the pilot pressure Pso16 is applied to the chamber 424 of the C2 control valve 410 which has been kept at the atmospheric pressure, whereby the valve spool 420 is placed in the engaging position (or ON position of FIG. 7) so that the ENGAGING pressure Pbc is applied to the HIGH-SHIFT actuator 106 through the flow restrictor 415 so as to engage the HIGH-GEAR clutch C2. At the same time, the pilot pressure Pso16 is applied to the chamber 448 of the B2 control valve 412 which has been kept at the atmospheric pressure. Nevertheless, the valve spool 442 of the B2 control valve 412 is held in the engaging position under the biasing force of the spring 444 since the chamber 446 of the valve 412 receives the pressure in the FORWARD actuator 42 which has been elevated to a level of the L/S/D0-shift pressure $P_F$. Thus, the high-gear position of the auxiliary transmission 18 is established by engaging the HIGH-GEAR clutch C2 while the LOW-GEAR brake B2 is kept engaged. FIG. 12 indicates variation of the pressures $P_{C2}$ and $P_{B2}$ of the HIGH-SHIFT and LOW-SHIFT actuators 106, 108 when the sixth solenoid-operated valve 162 is turned on to shift the transmission 18 from the low-gear position to the high-gear position.

Figure 13:
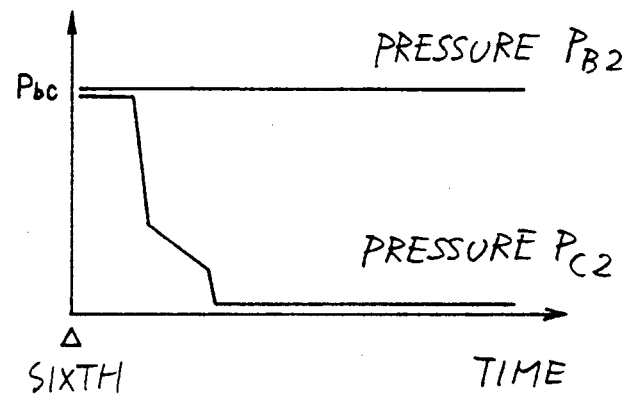
FIG. 13 is a time chart indicating the pressures $P_{B2}$ and $P_{C2}$ as a function of time, when the sixth solenoid-operated valve is turned off while the vehicle is running with the shift lever placed in the DRIVE position.

In the case where the accelerator pedal is largely depressed to effect a kick-down operation while the vehicle is running with the auxiliary transmission 18 placed in the high-gear position, the electronic control device 132 sends a control signal to turn off the sixth solenoid-operated valve 162. As a result, the chamber 448 of the B2 control valve 412 to which has been applied the pilot pressure Pso16 receives the atmospheric pressure. Consequently, the valve spool 442 of this valve 412 is held in the engaging position since the spool 442 has already been placed in the engaging position due to the pressure of the fluid in the FORWARD actuator 42. At the same time, the chamber 424 of the C2 control valve 410 to which has been applied the pilot pressure Pso16 receives the atmospheric pressure, whereby the valve spool 420 is moved to the releasing position (or OFF position in FIG. 7) against the biasing action of the spring 422, due to a thrust based on the pressure (L/S/D-shift pressure $P_F$) in the LOW-SHIFT actuator 108 which is applied to the chamber 426 of the valve 410. Consequently, the fluid is discharged from the HIGH-SHIFT actuator 106 through the flow restrictor 417 and drain port 418, whereby the HIGH-GEAR clutch C2 is released to establish the low-gear position of the transmission 18. The auxiliary transmission 18 is also shifted down in the same manner as described above when the actual speed ratio $\gamma_{CVT}$ of the CVT 16 becomes lower than a predetermined value $\gamma_0$ while the vehicle is running, as disclosed in laid-open Publication No. 61-241561 of unexamined Japanese Patent Application. FIG. 13 indicates variation of the pressures $P_{C2}$ and $P_{B2}$ of the HIGH-SHIFT actuator 106 and LOW-SHIFT actuator 108 when the sixth solenoid-operated valve 162 is turned off to shift the transmission 18 from the high-gear position to the low-gear position.

Figure 14:
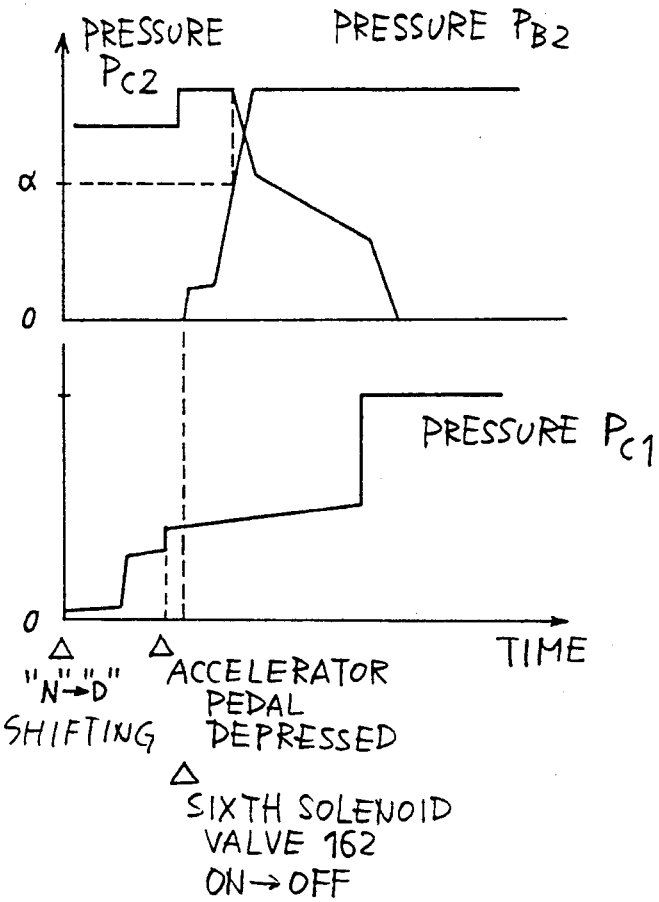
FIG. 14 is a time chart indicating the pressures $P_{C1}$, $P_{B2}$ and $P_{C2}$, when the accelerator pedal is depressed during an anti-squat control which follows operating of the shift lever from the NEUTRAL to DRIVE position.

In the case where the accelerator pedal is depressed during the above-described anti-squat control following the operation of the shift lever 142 from the NEUTRAL position "N" to the DRIVE position "D", the electronic control device 132 immediately sends a control signal to turn off the sixth solenoid-operated valve 162. As a result, the chamber 448 of the B2 control valve 412 to which has been applied the pilot pressure Pso16 receives the atmospheric pressure so that the valve spool 442 is moved from the releasing position to the engaging position due to the biasing force of the spring 444, whereby the working fluid is fed into the LOW-SHIFT actuator 108 to engage the LOW-GEAR brake B2. At the same time, the chamber 424 of the C2 control valve 410 to which has been applied the pilot pressure Pso16 receives the atmospheric pressure, so that the valve spool 420 is placed in the releasing position (or OFF position in FIG. 7) against the biasing action of the spring 422, due to a thrust based on the pressure (L/S/D-shift pressure $P_F$) in the LOW-SHIFT actuator 108 which is applied to the chamber 426 of the valve 410. Consequently, the fluid is discharged from the HIGH-SHIFT actuator 106 through the flow restrictor 417 and drain port 418, whereby the HIGH-GEAR clutch C2 is released to establish the low-gear position of the transmission 18. FIG. 14 indicates variation of the pressures $P_{C1}$, $P_{C2}$ and $P_{B2}$ when the accelerator pedal is depressed during the anti-squat control.

Figure 15:
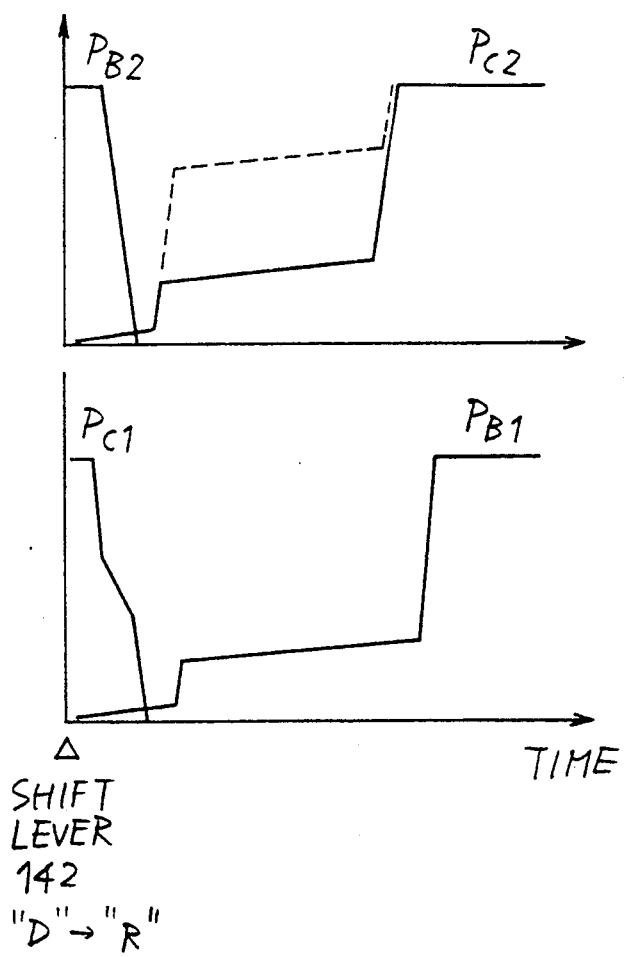
FIG. 15 is a time chart indicating pressures $P_{C1}$, $P_{B1}$, $P_{B2}$ and $P_{C2}$ in the hydraulic control circuit of FIG. 7 as a function of time, upon operating of the shift lever from the DRIVE position to the REVERSE position.

When the shift lever 142 is operated from the DRIVE position "D" to the "REVERSE" position "R" with the auxiliary transmission 18 placed in the low gear position, while the vehicle is running in the forward direction at a low speed just before it is stopped, for example, the manual valve 310 is operated to release the FORWARD clutch C1 which has been engaged, and cause the REVERSE actuator 44 to start engaging the REVERSE brake B1. At the same time, the sixth solenoid-operated valve 162 is turned on as shown in FIG. 3, so as to initiate engagement of the HIGH-SHIFT clutch C2 which has been disengaged. Further, the pressures in the FORWARD actuator 42 and in the chamber 446 of the B2 control valve 412 are discharged by the manual valve 310, while the pilot pressure Pso16 is applied from the solenoid-operated valve 162 to the chamber 448 of the B2 control valve 412, whereby the valve spool 442 of the valve 412 is moved to the releasing or ON position in which the accumulator 428 receives as a back pressure the ENGAGING pressure Pbc which is higher than the THROTTLE pressure Pth. According to this arrangement, the pressure $P_{C2}$ in the HIGH-SHIFT actuator 106 is increased upon operating of the shift lever 142 from the DRIVE position "D" to the REVERSE position "R", as indicated by the broken line in FIG. 15, due to the relatively high back pressure Pbc of the accumulator 428, as compared with the pressure $P_{C2}$ as indicated by the solid line which is generated during the normal shifting of the auxiliary transmission 18. Thus, the HIGH-GEAR clutch C2 in the process of engagement is given a larger torque capacity than the REVERSE brake B1.

When the shift lever 142 is operated from the DRIVE position "D" to the REVERSE position "R", therefore, the HIGH-GEAR clutch C2 having the larger engaging torque capacity is first engaged, followed by engagement of the REVERSE brake B1, thereby eliminating otherwise possible double shift shock due to the engagement of the clutch C2 and brake B1. That is, the shift shock caused by the engagement of the REVERSE brake B1 can be dealt with by suitably tuning the flow restrictor 386 and accumulator 404 to allow the REVERSE brake B1 to be slowly engaged as in the case of the normal shifting from the NEUTRAL position to the REVERSE position. As for the engagement of the HIGH-GEAR clutch C2, the characteristics of the accumulator 428 are suitably determined so as to alleviate the shift shock induced upon shifting of the auxiliary transmission 18 from the low-gear position to the high-gear position.

In the hydraulic control circuit 170 of the present embodiment, the shifting operation of the auxiliary transmission 18 between the low-gear and high-gear positions is smoothly accomplished only by engaging or releasing the HIGH-GEAR clutch C2, without complicated timing control for engagement of two or more frictionally coupling devices, and without an influence of a variation in engaging or releasing time of the clutch C2. As described above, the LOW-SHIFT actuator 108 is operated to engage the LOW-GEAR clutch B2, based on the L/S/D-shift pressure $P_F$ delivered from the manual valve 310. When the shift lever 142 is operated to the REVERSE position "R", therefore, the engagement of the LOW-GEAR clutch B2 is inhibited irrespective of the operating position of the B2 control valve 412, thereby preventing the auxiliary transmission 18 from being locked due to failing of the valve 412 during the reverse running of the vehicle, for example.

Referring back to FIG. 4, a CLUTCH pressure Pc1 in the above-indicated clutch pressure line 182 is regulated by a clutch pressure regulating valve 450, based on the THROTTLE pressure Pth produced by the throttle sensing valve 220. Although the CLUTCH pressure Pc1 is used to engage the lock-up clutch 38, the fluid in the clutch pressure line 182 is also fed through a flow restrictor 453 to various parts of the power transmitting system, such as sliding portions of the belt 76, bearings, engaging portions of the planetary gears 54, 56, 94, and differential gear device 22, to serve as a lubricating oil. To these parts of the system is also fed as a lubricating oil the fluid which is delivered from a relief port 455 of the clutch pressure regulating valve 450. The clutch pressure regulating valve 450 includes: a valve spool 452 which has an open position for discharging the clutch pressure line 182 into the return line 176; a spring 454 for biasing the valve spool 452 toward its closed position; a plunger 456 adapted to receive the THROTTLE pressure Pth to produce a thrust which acts on the valve spool 452 in the direction toward its closed position; and a chamber 458 which receives as a feedback pressure the CLUTCH pressure Pc1 that acts on the valve spool 452 in the direction toward the open position.

To control engagement and disengagement of the lock-up clutch 38, there are provided a lock-up relay valve 460 which is controlled by the third solenoid-operated valve 156, and a lock-up control valve 462 which is controlled by the fourth solenoid-operated valve 158. The lock-up relay valve 460 has a drain port 464, a first port 468 to which is applied the CLUTCH pressure Pc1 through a check valve 466, a second port 470, a third port 472, a fourth port 474, a fifth port 476 and a drain port 478. The relay valve 460 includes a valve spool 480 for effecting connection and disconnection between these ports, and a spring 484 for biasing the valve spool 480 toward a chamber 482 formed at the lower end of the spool 480. When the pilot pressure Pso13 generated by the third solenoid-operated valve 156 is not applied to the chamber 482, the valve spool 480 is moved toward the chamber 482 and placed in its lower position (or OFF position in FIG. 4), for fluid communication between the first and second ports 468, 470, the third and fourth ports 472, 474 and the fifth and drain ports 476, 478. When the pilot pressure Pso13 is applied to the chamber 482, on the other hand, the valve spool 480 is moved toward the spring 484 and placed in its upper position (or ON position in FIG. 4), for fluid communication between the drain and second ports 464, 470, the first and third ports 468, 472 and the fourth and fifth ports 474, 476.

The lock-up control valve 462 has: a first port 490 to which is applied the CLUTCH pressure Pc1 through a check valve 466; a second port 492 connected to &:he second port 470 of the lock-up relay valve 460; a third port 494 connected to the fifth port 476 of the relay valve 460; a fourth port 496 connected to the third port 472 of the relay valve 460; a fifth port 498 connected to the releasing chamber 46 of the fluid coupling 12; and a sixth port 500 connected to the engaging chamber 48 of the fluid coupling 12. The lock-up control valve 462 includes: a valve spool 502 for effecting connection and disconnection between these ports, and a spring 506 for biasing the valve spool 502 toward a chamber 504 formed at the lower end of the spool 502. When the pilot pressure Pso14 generated by the fourth solenoid-operated valve 158 is not applied to the chamber 504, the valve spool 502 is moved toward the chamber 504 and placed in its lower position (or OFF position in FIG. 4), for fluid communication between the second and fifth ports 492, 498, and between the fourth and sixth ports 496, 500. When the pilot pressure Pso14 is applied to the chamber 504, on the other hand, the valve spool 502 is moved toward the spring 506 and placed in its upper position (or ON position in FIG. 4), for fluid communicating between the first and fifth ports 490, 498 and between the third and sixth ports 494, 500.

When the third and fourth solenoid-operated valves 156, 158 are both off, therefore, the CLUTCH pressure Pc1 is applied to the releasing chamber 46, through the first and second ports 468, 470 of the valve 460 and the second and fifth ports 492, 498 of the valve 462, while the fluid in the engaging chamber 48 is drained through the sixth and fourth ports 500, 496 of the valve 462, the fourth port 474 of the valve 460, and an oil cooler 510, whereby the lock-up clutch 38 is released. At this time, a portion of the fluid discharged from the engaging chamber 48 is drained through the oil cooler 510. Downstream of the oil cooler 510, there is provided a cooler by-pass valve 512 which is adapted to drain the fluid discharged from the engaging chamber 48 when the pressure of the fluid exceeds a predetermined level. When the third and fourth solenoid-operated valves 156, 158 are both on, the CLUTCH pressure Pc1 is applied to the releasing chamber 46 through the first and fifth ports 490, 498 of the valve 462, while the fluid in the engaging chamber 48 is drained through the sixth and third ports 500, 494 of the valve 462, the fifth and fourth ports 476, 474 of the valve 460, and the oil cooler 510, whereby the lock-up clutch 38 is released. Thus, there are two operating modes for releasing the lock-up clutch 38.

When the third solenoid-operated valve 156 is off while the fourth solenoid-operated valve 158 is on, the CLUTCH pressure Pc1 is applied to the releasing chamber 46, through the first and fifth ports 490, 498 of the valve 462, while the fluid in the engaging chamber 48 is drained through the sixth and third ports 500, 494 of the valve 462, and the fifth and drain ports 476, 478 of the valve 460, whereby the lock-up clutch 38 is rapidly released In this case, the fluid in the engaging chamber 48 is discharged into a drain without passing through the oil cooler 510, and the pilot pressure Pso14 is also applied from the fourth solenoid-operated valve 158 to the chamber 286 of the belt tensioning pressure regulating valve 224 (FIG. 5) to increase the belt tensioning pressure Pbelt. The thus increased belt tensioning pressure Pbelt is applied to the chamber 214 of the first pressure regulating valve 180 (FIG. 5) to increase the first line pressure Pr1, resulting in an increase in the THROTTLE pressure Pth produced by the throttle sensing valve 220 using the first line pressure Pr1. Consequently, the increased THROTTLE pressure Pth is applied to the clutch pressure regulating valve 450 to increase the CLUTCH pressure Pc1, whereby the lock-up clutch 38 is rapidly released. This rapid releasing mode of the lock-up clutch 38 is established when the CVT 16 is rapidly shifted down so as to reduce the vehicle speed upon sudden stop of the vehicle.

When the third solenoid-operated valve 156 is on while the fourth solenoid-operated valve 158 is off, the CLUTCH pressure Pc1 is applied to the engaging chamber 48 through the first and third ports 468, 472 of the lock-up relay valve 460 and the fourth and sixth ports 496, 500 of the lock-up control valve 462, while the fluid in the releasing chamber 46 is drained through the fifth and second ports 498, 492 of the valve 462 and the second and drain ports 470, 464 of the valve 460, whereby the lock-up clutch 38 is engaged.

The above-indicated electronic control device 132 is adapted to execute various control routines for controlling the speed ratio $\gamma_{CVT}$ of the CVT 16, the operating state of the lock-up clutch 38, the rapid shift-down of the CVT 16, the tension of the belt 76, and the shifting operation of the auxiliary transmission 18. For instance, the first and second solenoid-operated valves 152, 154 are energized or turned on by the control device 132, for adjusting the speed ratio $\gamma_{CVT}$ of the CVT 16 so that the engine 10 operates according to a known optimum curve which assures minimum fuel consumption by the engine 10 and maximum drivability of the vehicle. In controlling the lock-up clutch 38, the control device 132 determines whether the lock-up clutch 38 should be engaged or not, according to a predetermined relationship among various parameters, such as the vehicle speed SPD and throttle opening angle $\theta$th. If an affirmative decision (YES) is obtained, the third solenoid-operated valve 156 is turned on, and the fourth solenoid-operated valve 158 is turned off. If a negative decision (NO) is obtained, that is, if the control device 132 determines that the lock-up clutch 38 should be released, the third and fourth solenoid-operated valves 156, 158 are both turned off.

In controlling the rapid shift-down of the CVT 16 prior to a sudden stop of the vehicle, the first and second solenoid-operated valves 152, 154 are both turned on to establish the rapid shift-down mode of the CVT 16, while the third and fourth solenoid-operated valves 156, 158 are turned off and on, respectively, so as to rapidly release the lock-up clutch 38. In controlling the tension of the belt 76, the fifth solenoid-operated valve 160 is controlled so that the belt tensioning pressure Pbelt to be applied the second hydraulic actuator 88 is adjusted to an optimum pressure which provides a minimum tension of the belt 76 to transmit a desired torque without slipping of the belt on the pulleys 72, 73. In controlling shifting of the auxiliary transmission 18, the control device 132 determines whether the transmission 18 should be placed in the low-gear or high-gear position, according to a predetermined stored relationship among various parameters, such as the actual throttle opening angle $\theta$th, speed ratio $\gamma_{CVT}$ and vehicle speed SPD, as disclosed in laid-open Publication Nos. 61-241561 and 62-137239 of unexamined Japanese Patent Applications. According to the determination, the sixth solenoid-operated valve 162 is turned on for establishment of the high-gear position, and is turn off for establishment of the low-gear position.

In the present embodiment, the pressure in the FORWARD actuator 42 is adapted to preferentially place the valve spool 442 of the B2 control valve 412 in the position for engaging the LOW-GEAR brake B2 when the vehicle is running with the shift lever 142 being placed in one of the LOW, SECOND and DRIVE positions "L", "S", "D". Therefore, the pilot pressure Pso16 from the sixth solenoid-operated valve 162 is used only to control the operating position of the C2 control valve 410. During the anti-squat control effected immediately after the shift lever 142 is operated from the NEUTRAL position "N" to one of the LOW, SECOND and DRIVE positions "L", "S", "D", however, the above-indicated pilot pressure Pso16 is also used to control the operating position of the B2 control valve 412 until the pressure in the FORWARD actuator 42 is raised to a sufficiently high level. In this condition, the B2 control valve 412 and C2 control valve 410 are concurrently switched by the pilot pressure Pso16 from the sixth solenoid-operated valve 162, so as to engage the LOW-GEAR brake B2 which has been released, and release the HIGH-GEAR clutch C2 which has been engaged.

It follows from the above description that the sixth solenoid-operated valve 162 is operated to switch only one of the B2 control valve 412 and C2 control valve 410, or concurrently switch these two control valves 412, 410, depending upon the level of the pressure in the FORWARD actuator 42 that is applied to the B2 control valve 412 to preferentially place the valve spool 442 in the position for engaging the LOW-GEAR brake B2. This arrangement leads to a simple construction of the present hydraulic control apparatus, as compared with an arrangement wherein the B2 and C2 control valves 412, 410 were respectively controlled by two solenoid-operated valves.

In the present embodiment as described above, when the shift lever 142 is operated from the DRIVE position "D" to the REVERSE position "R" while the auxiliary transmission 18 is placed in the low-gear position, the manual valve 310 is operated to engage the REVERSE brake B1 instead of the FORWARD clutch C1 which has been engaged. At the same time, the sixth solenoid-operated valve 162 is turned on to place the B2 control valve 412 and C2 control valve 410 in the releasing and engaging positions, respectively, so that the HIGH-GEAR clutch C2 is engaged instead of the LOW-GEAR brake B2 which has been engaged. The B2 control valve 412, which is switched to the releasing position, delivers through the fifth port 440 the ENGAGING pressure Pbc as a back pressure of the accumulator 428, instead of the THROTTLE pressure Pth which has been generated. As the back pressure of the accumulator 428 is thus increased by the ENGAGING pressure Pbc which is higher than the THROTTLE pressure Pth, the pressure $P_{C2}$ applied to the HIGH-GEAR clutch C2 is increased during an engaging action of the clutch C2, i.e., while the accumulator 428 operates to gradually increase the pressure $P_{C2}$, as indicated in the broken line in FIG. 15, assuring a relatively large torque capacity of the clutch C2 which is being engaged. In the instant embodiment, the B2 control valve 412 serves as means for increasing the engaging torque capacity of the HIGH-GEAR clutch C2 and means for increasing the back pressure of the accumulator for the HIGH-GEAR clutch C2, upon operating of the shift lever 142 from the DRIVE position "D" to the REVERSE position "R".

With the increase in the torque capacity of the HIGH-GEAR clutch C2 during the engaging action thereof, the engagement of the HIGH-GEAR clutch C2 is first completed, preceding completion of the engagement of the REVERSE brake B1, thereby effectively avoiding the above-described double shift shock due to the engagement of the clutch C2 and brake B1. In the meantime, the shift shock which occurs upon establishment of the reverse gear position of the reversing device 14 is sufficiently absorbed based on the engaging characteristics of the REVERSE brake B1 which are suitably determined by the accumulator 404.

Further, the engaging characteristics of the HIGH-GEAR clutch C2 for establishing the high-gear position may be determined or designed with a high degree of freedom, since the clutch C2 has no relation to the shift shock occurring upon establishment of the reverse gear position of the reversing device 14. Moreover, the prior engagement of the HIGH-GEAR clutch C2 reduces slipping of the components of the clutch C2, assuring improved durability thereof. Furthermore, the above arrangement does not require a timing valve or other control valve mechanism for determining timing for engaging the HIGH-GEAR clutch C2 and REVERSE brake B2, thereby making the instant hydraulic control circuit simplified. In addition, the means for changing the back pressure of the accumulator 428 is incorporated in the B2 control valve 412, making it unnecessary to provide a timing valve or switch valve for changing the back pressure, whereby the instant hydraulic control circuit is further simplified.

In the present embodiment described above, the LOW-GEAR brake B2 and HIGH-GEAR clutch C2 are respectively controlled by the B2 control valve 412 and C2 control valve 410 which are actuated by a common pilot pressure. When 0.7 sec. of anti-squat control is terminated after the shift lever 142 is operated from the NEUTRAL position "N" to the DRIVE position "D", or when the accelerator pedal is depressed during the anti-squat control immediately after the operation of the shift lever 142, for example, the sixth solenoid-operated valve 162 is turned off so as to engage the LOW-GEAR brake B2 and release the HIGH-GEAR clutch C2 to place the auxiliary transmission 18 in the low-gear position. In this case, the valve spool 420 of the C2 control valve 410 is placed in the position for releasing the HIGH-GEAR clutch C2 when the pressure in the LOW-GEAR actuator 108, that is, the pressure for engaging the LOW-GEAR brake B2, is elevated by the B2 control valve 412 to a level higher than "$\alpha$" as indicated in FIG. 14, in other words, when a thrust based on the pressure for engaging the LOW-GEAR brake B2, which acts on the valve spool 420 of the C2 control valve 410, exceeds a predetermined value that corresponds to the biasing force of the spring 422. Thus, a well-timed releasing of the HIGH-GEAR clutch C2 is effected when the LOW-GEAR brake B2 reaches a predetermined state of engagement.

Since the releasing of the HIGH-GEAR clutch C2 is commenced when the LOW-GEAR brake B2 is in the predetermined state of engagement, the brake B2 and clutch C2 are both surely engaged for a short period of time, assuring a smooth gear change of the auxiliary transmission 18. This also prevents racing of the engine due to considerably early releasing of the HIGH-GEAR clutch C2, and locking of the transmission 18 due to considerably late releasing of the clutch C2.

While the present invention has been described in its presently preferred embodiment by reference to the accompanying drawings, it is to be understood that the invention may be otherwise embodied, without departing from the spirit of the invention.

While the sixth solenoid-operated valve 162 generates the pilot pressure Pso16 when it is placed in the on position in the illustrated embodiment, the pressure Pso16 may be generated when the valve 162 is off. In this case, the electronic control device 132 applies to the sixth solenoid-operated valve 182 ON-OFF command signals which are opposite to those applied in the illustrated embodiment. Alternatively, the B2 control valve may be adapted to apply the L/S/D-shift pressure $P_F$ to the LOW-GEAR brake B2 upon receiving the atmospheric pressure as the pilot pressure Pso16 from the sixth solenoid-operated valve 162, while the C2 control valve may be adapted to apply the L/S/D-shift pressure $P_F$ to the HIGH-GEAR clutch C2 upon receiving the atmospheric pressure as the pilot pressure Pso16 from the sixth solenoid-operated valve 162.

In the illustrated embodiment, the B2 control valve 412 is operated to vary the back pressure of the accumulator 428 from the THROTTLE pressure Pth to the ENGAGING pressure Pbc, so as to increase the torque capacity of the HIGH-GEAR clutch C2 during its engaging action. However, a shut-off valve may be provided between the accumulator 428 and the HIGH-SHIFT actuator 106 for disconnecting the accumulator 428 from the actuator 106 when the B2 control valve 412 is operated to the position for releasing the LOW-GEAR brake B2. This shut-off valve serves to eliminate the time duration in which the pressure $P_{C2}$ is slowly increased by the operation of the accumulator 428 for engagement of the HIGH-GEAR clutch C2. Instead, the pressure $P_{C2}$ is rapidly raised to increase the torque capacity of the HIGH-GEAR clutch C2 during the initial period of the engaging action. In this case, the shut-off valve serves as means for increasing the engaging torque capacity of the HIGH-GEAR clutch C2.

The illustrated embodiment as shown in FIG. 7 may be modified by providing a bypass valve for bypassing the flow restrictor 415 which is disposed upstream of the second port 416 of the C2 control valve 410 so as to limit the fluid flow into the HIGH-GEAR clutch C2. When the B2 control valve 412 is operated to the position for releasing the LOW-GEAR brake B2, the bypass valve operates to bypass the flow restrictor 415 to rapidly increase the pressure $P_{C2}$ of the HIGH-GEAR clutch C2, to thereby increase the torque capacity of the HIGH-GEAR clutch C2 during the initial period of the engaging action. In this case, the bypass valve serves as means for increasing the engaging torque capacity of the HIGH-GEAR clutch C2.

While the auxiliary transmission 18 is disposed downstream of the CVT 16 in the power transmitting system in the illustrated embodiment, the principle of the present invention may be equally applied to the power transmitting system in which the transmission 18 is disposed upstream of the CVT 16.

While the power transmitting system employs the belt-and-pulley type continuously variable transmission (CVT) 16 as a primary or main transmission, it may be replaced by a so-called traction-type continuously variable transmission adapted to transmit power via a roller which is interposed between a pair of cones.

The auxiliary transmission 18 may have three or more gear positions, rather than two positions (i.e., high-and low-gear positions) of the illustrated embodiment.

It is to be understood that the present invention may be embodied with various other changes, modifications and improvements, which may occur to those skilled in the art, without departing from the scope of the invention defined in the following claims.

What is claimed is:

1. A hydraulic control apparatus for a power transmitting system of a motor vehicle which includes: a continuously variable transmission whose speed ratio is continuously variable; a reversing gear device which is rotated in opposite directions to permit forward and reverse runs of the vehicle, said reversing gear device having a forward frictionally coupling device and a reverse frictionally coupling device which are hydraulically operated to select the corresponding forward or reverse run of the vehicle, depending upon a currently selected position of a shift lever of the vehicle; and an auxiliary transmission having a low-gear frictionally coupling device and a one-way clutch which are disposed in series, and a high-gear frictionally coupling device, said auxiliary transmission being placed in a selected one of a low-gear position by engagement of said low-gear frictionally coupling device and said one-way clutch, and a high-gear position by engagement of said high-gear frictionally coupling device, said hydraulically control apparatus comprising:

a solenoid-operated valve for generating a pilot pressure in response to a command signal for placing said auxiliary transmission in one of said low-gear position and said high-gear position;

a high-gear control valve for controlling said high-gear frictionally coupling device, said high-gear control valve including a first valve spool which is operable based on said pilot pressure between an engaging position and a releasing position for engaging and releasing said high-gear frictionally coupling device, respectively; and a low-gear control valve for controlling said low-gear frictionally coupling device, said low-gear control valve including a second valve spool which is operable based on said pilot pressure between an engaging position and a releasing position for engaging and releasing said low-gear frictionally coupling device, respectively, said second valve spool being placed in said engaging position irrespective of said pilot pressure when said low-gear control valve receives a pressure applied to said forward frictionally coupling device for engagement thereof, which pressure is higher than a predetermined level.

2. A hydraulic control apparatus according to claim 1, further comprising an electronic control device for applying said command signal to said solenoid-operated valve.

3. A hydraulic control apparatus according to claim 1, wherein said solenoid-operated valve generates said pilot pressure when said command signal indicates that said auxiliary transmission should be placed in said high-gear position, said first valve spool of said high-gear control valve being moved to said engaging position when said pilot pressure is applied to said high-gear control valve.

4. A hydraulic control apparatus according to claim 3, wherein said second valve spool of said low-gear control valve is placed in said engaging position when said pilot pressure is not applied to said low-gear control valve, and/or when said pressure applied to said forward frictionally coupling device is applied to said low-gear control valve.

5. A hydraulic control apparatus according to claim 4, wherein said low-gear control valve has a first chamber for receiving said pilot pressure, and a second chamber for receiving said pressure applied to said forward frictionally coupling device, said second valve spool being disposed between said first and second chambers, said low-gear control device further including a spring accommodated in said second chamber for biasing said second valve spool toward said engaging position.

6. A hydraulic control apparatus according to claim 5, wherein said low-gear frictionally coupling device is engaged when said first and second chambers both receive an atmospheric pressure or when said first chamber receives said pilot pressure while said second chamber receives said pressure applied to said forward frictionally coupling device, said low-gear frictionally coupling device being released when said first chamber receives said pilot pressure while said second chamber receives the atmospheric pressure, said pilot pressure being higher than the atmospheric pressure.

7. A hydraulic control apparatus for a power transmitting system of a motor vehicle which includes: a continuously variable transmission whose speed ratio is continuously variable; a reversing gear device which is rotated in opposite directions to permit forward and reverse runs of the vehicle, said reversing gear device having a forward frictionally coupling device and a reverse frictionally coupling device which are hydraulically operated to select the corresponding forward or reverse run of the vehicle, depending upon a currently selected position of a shift lever of the vehicle; and an auxiliary transmission disposed in series with said reversing gear device, and having a low-gear frictionally coupling device and a high-gear frictionally coupling device which are hydraulically operated to place said auxiliary transmission in a low-gear position and a high-gear position, respectively, said reverse frictionally coupling device and said high-gear frictionally coupling device being engaged when said shift lever is operated to a reverse-drive position for the reverse run of the vehicle, so that said reversing gear device is rotated in one of said opposite directions which permits the reverse run of the vehicle while said auxiliary transmission is placed in said high-gear position, said hydraulically control apparatus comprising:

means for increasing a torque capacity of said high-gear frictionally coupling device during an engaging action thereof when said shift lever is operated from a forward-drive position for the forward run of the vehicle to said reverse-drive position.

8. A hydraulic control apparatus according to claim 7, wherein said means for increasing a torque capacity comprises:

a low-gear control valve for controlling said low-gear frictionally coupling device, said low-gear control valve being operable between an engaging position and a releasing position for engaging and releasing said low-gear frictionally coupling device, respectively;

an accumulator for slowly increasing an engaging pressure to be applied to said high-gear frictionally coupling device for engagement thereof; and back-pressure increasing means incorporated in said low-gear control valve for increasing a back pressure of said accumulator to thereby increase said torque capacity of said high-gear frictionally coupling device when said low-gear control valve is operated from said engaging position to said releasing position.

9. A hydraulic control apparatus according to claim 8, wherein said low-gear control valve has a first port for receiving a first pressure, a second port for receiving a second pressure higher than said first pressure, and a third port connected to said accumulator, said first port communicating with said third port when said low-gear control valve is placed in said engaging position, so that said first pressure is applied as a back pressure to said accumulator, said second port communicating with said third port when said low-gear control valve is placed in said releasing position, so that said second pressure is applied as a back pressure to said accumulator.

10. A hydraulic control apparatus for a power transmitting system of a motor vehicle which includes a continuously variable transmission, a reversing gear device, and an auxiliary transmission disposed apart from said reversing gear device, said auxiliary transmission having a low-gear frictionally coupling device and a one-way clutch which are disposed in series, and a high-gear frictionally coupling device, said auxiliary transmission being placed in a selected one of a low-gear position by engagement of said low-gear frictionally coupling device and said one-way clutch, and a high-gear position by engagement of said high-gear frictionally coupling device, a power transmitting line of the power transmitting system being disconnected when both of said low-gear and high-gear frictionally coupling devices are disengaged, said hydraulic control apparatus comprising:

a solenoid-operated valve for generating a pilot pressure in response to a command signal for placing said auxiliary transmission in one of said low-gear position and said high-gear position;

a low-gear control valve for controlling said low-gear frictionally coupling device, said low-gear control valve including a first valve spool which is operable based on said pilot pressure between an engaging position and a releasing position for engaging and releasing said low-gear frictionally coupling device, respectively; and a high-gear control valve for controlling said high-gear frictionally coupling device, said high-gear control valve including a second valve spool which is operable based on said pilot pressure between an engaging position and a releasing position for engaging and releasing said high-gear frictionally coupling device, respectively, said second valve spool being moved to said releasing position when a thrust based on an engaging pressure applied to said low-gear frictionally coupling device exceeds a predetermined value.

11. A hydraulic control apparatus according to claim 10, further comprising an electronic control device for applying said command signal to said solenoid-operated valve.

12. A hydraulic control apparatus according to claim 10, wherein said solenoid-operated valve generates said pilot pressure when said command signal indicates that said auxiliary transmission should be placed in said high-gear position, said high-gear control valve having a first chamber for receiving said pilot pressure, a second chamber for receiving said engaging pressure, and a spring accommodated in said first chamber, said second valve spool being disposed between said first and second chambers, said second valve spool being moved to said releasing position to initiate releasing of said high-gear frictionally coupling device when said thrust based on said engaging pressure exceeds a biasing force of said spring as said predetermined level while said pilot pressure is not applied to said first chamber.

13. A hydraulic control apparatus according to claim 10, wherein said reversing gear device has a forward frictionally coupling device and a reverse frictionally coupling device which are hydraulically operated to select forward and reverse runs of the vehicle, respectively, depending upon a currently selected position of a shift lever of the vehicle, said first valve spool of said low-gear control valve being placed in said engaging position irrespective of said pilot pressure when said low-gear control valve receives a pressure applied to said forward frictionally coupling device for engagement thereof, which pressure is higher than a predetermined level.

* * * * *